(12) United States Patent
Thomas et al.

(10) Patent No.: US 10,397,666 B2
(45) Date of Patent: Aug. 27, 2019

(54) DETERMINING A REGION OF INTEREST ON THE BASIS OF A HEVC-TILED VIDEO STREAM

(71) Applicant: Koninklijke KPN N.V., Rotterdam (NL)

(72) Inventors: Emmanuel Thomas, Delft (NL); Ray Van Brandenburg, The Hague (NL); Mattijs Oskar Van Deventer, Leidschendam (NL)

(73) Assignee: Koninklijke KPN N.V., Rotterdam (NL)

( * ) Notice: Subject to any disclaimer, the term of this patent is extended or adjusted under 35 U.S.C. 154(b) by 0 days.

(21) Appl. No.: 15/318,631

(22) PCT Filed: Jun. 26, 2015

(86) PCT No.: PCT/EP2015/064511
§ 371 (c)(1),
(2) Date: Dec. 13, 2016

(87) PCT Pub. No.: WO2015/197815
PCT Pub. Date: Dec. 30, 2015

(65) Prior Publication Data
US 2017/0118540 A1    Apr. 27, 2017

(30) Foreign Application Priority Data

Jun. 27, 2014   (EP) ..................... 14174815

(51) Int. Cl.
*H04N 21/858* (2011.01)
*H04N 21/2343* (2011.01)
(Continued)

(52) U.S. Cl.
CPC ....... *H04N 21/8586* (2013.01); *H04N 19/119* (2014.11); *H04N 19/167* (2014.11);
(Continued)

(58) Field of Classification Search
None
See application file for complete search history.

(56) References Cited

U.S. PATENT DOCUMENTS 7,894,531 B1    2/2011  Cetin et al.
9,699,465 B2 *  7/2017  Ouedraogo .......... H04N 19/159
(Continued)

FOREIGN PATENT DOCUMENTS

EP    2 814 243    12/2014
GB    2505912      3/2014
(Continued)

OTHER PUBLICATIONS

Notification of Transmittal of The International Search Report and The Written Opinion of The International Searching Authority, or The Declaration, International Application No. PCT/EP2015/064511, entitled "Determining a Region of Interest on the Basis of a HEVC-Tiled Video Stream", dated Sep. 14, 2015.
(Continued)

*Primary Examiner* — Justin E Shepard
(74) *Attorney, Agent, or Firm* — Hamilton, Brook, Smith & Reynolds, P.C.

(57) ABSTRACT

A method is described for determining a region-of-interest (ROI) for a client device on the basis of at least one HEVC-tiled (panorama) video stream wherein the method comprises: receiving a ROI video stream for rendering a first ROI defining a first sub-region within the full image region of said HEVC-tiled video stream, the positions of HEVC tiles in said HEVC-tiled panorama video being defined by tile position information; providing ROI position information associated with at least one video frame of said ROI video stream, said ROI position information comprising at least first position of said first ROI; identifying one or more HEVC tiles of said HEVC-tiled video stream on the basis of said ROI position information and said tile position infor-
(Continued)

mation, preferably one or more HEVC tiles that overlap with said first ROI; and, requesting video data associated with said one or more identified HEVC tiles for rendering a second ROI defining a second sub-region within the full image region of said HEVC-tiled video stream.

27 Claims, 23 Drawing Sheets

(51) Int. Cl.
    *H04N 21/4728*     (2011.01)
    *H04N 21/6587*     (2011.01)
    *H04N 21/845*     (2011.01)
    *H04N 21/854*     (2011.01)
    *H04N 19/119*     (2014.01)
    *H04N 19/174*     (2014.01)
    *H04N 19/167*     (2014.01)
    *H04N 19/85*     (2014.01)
    *H04N 21/4402*     (2011.01)

(52) U.S. Cl.
    CPC ........... *H04N 19/174* (2014.11); *H04N 19/85* (2014.11); *H04N 21/2343* (2013.01); *H04N 21/234327* (2013.01); *H04N 21/234363* (2013.01); *H04N 21/440263* (2013.01); *H04N 21/4728* (2013.01); *H04N 21/6587* (2013.01); *H04N 21/8455* (2013.01); *H04N 21/85406* (2013.01)

(56) References Cited

U.S. PATENT DOCUMENTS

| | | | |
|---|---|---|---|
| 9,860,572 | B2 | 1/2018 | van Deventer et al. |
| 9,883,011 | B2 | 1/2018 | Denoual et al. |
| 2006/0120610 | A1* | 6/2006 | Kong ............. H04N 21/234345 382/232 |
| 2006/0262345 | A1 | 11/2006 | Le Leannec Fabrice et al. |
| 2009/0300692 | A1 | 12/2009 | Mavlankar et al. |
| 2010/0135575 | A1* | 6/2010 | Guo ........................ H04N 9/646 382/164 |
| 2010/0232504 | A1 | 9/2010 | Feng |
| 2011/0096990 | A1* | 4/2011 | Lu ........................ H04N 19/103 382/173 |
| 2013/0235270 | A1 | 9/2013 | Sasaki et al. |
| 2014/0079126 | A1* | 3/2014 | Ye ........................ H04N 19/105 375/240.16 |
| 2014/0089990 | A1* | 3/2014 | van Deventer ...... H04N 21/218 725/61 |
| 2014/0341549 | A1 | 11/2014 | Hattori |
| 2015/0095450 | A1* | 4/2015 | Vitthaladevuni ....... H04L 47/25 709/217 |
| 2015/0208103 | A1 | 7/2015 | Guntur et al. |
| 2015/0237166 | A1 | 8/2015 | Denoual et al. |
| 2015/0264404 | A1 | 9/2015 | Hannuksela |
| 2016/0165309 | A1 | 6/2016 | Thomas et al. |
| 2017/0155912 | A1 | 6/2017 | Thomas et al. |
| 2017/0180444 | A1 | 6/2017 | Denoual et al. |
| 2018/0242028 | A1 | 8/2018 | Van Brandenburg et al. |
| 2018/0295400 | A1 | 10/2018 | Thomas |

FOREIGN PATENT DOCUMENTS

| | | |
|---|---|---|
| GB | 2 513 139 | 10/2014 |
| GB | 2524531 | 9/2015 |
| JP | 2005142654 | 6/2005 |
| JP | 2012049806 | 3/2012 |
| WO | WO 2001/95513 A1 | 12/2001 |
| WO | 2008/088772 | 7/2008 |
| WO | WO 2009/003885 A2 | 1/2009 |
| WO | WO 2012/168356 | 12/2012 |
| WO | WO 2012/168365 | 12/2012 |
| WO | WO 2013/063094 | 5/2013 |
| WO | WO 2014/057131 A1 | 4/2014 |
| WO | WO 2014/0106651 | 7/2014 |
| WO | WO 2014/111423 | 7/2014 |
| WO | WO 2014/168972 | 10/2014 |
| WO | 2015/011109 | 1/2015 |
| WO | WO 2015/004276 A2 | 1/2015 |
| WO | WO 2015/008774 A1 | 1/2015 |
| WO | WO 2015/014773 A1 | 2/2015 |
| WO | WO 2015/059194 | 4/2015 |
| WO | WO 2015/104451 | 7/2015 |
| WO | WO 2015/197815 A1 | 12/2015 |
| WO | WO 2015/197818 A1 | 12/2015 |
| WO | 2017/029400 | 2/2017 |
| WO | 2017/029402 | 2/2017 |
| WO | WO 2017/060423 | 4/2017 |

OTHER PUBLICATIONS

Hannuksela, M.M., et al., "Isolated Regions in Video Coding," *IEEE Transactions on Multimedia*, 6(2): 259-267 (Apr. 1, 2004).

Ye, Y. and Horowitz, M., et al., "ROI Tile Sections," Joint Collaborative Team on Video Coding (JCT-VC) of ITU-T SG 16 WP 3 and ISO/IEC JTC 1?SC 29/WG 11, 11th Meeting: Shanghai, CN, pp. 1-7 (Oct. 10, 2012).

Wang, Y-K., et al., "Tile Groups," Joint Collaborative Team on Vide Coding (JCT-VC) of ITU-T SG16 WP3 and ISO/IEC JTC1/SC29/WG11, 7th Meeting: Geneva, CH, pp. 1-9 (Nov. 21-30, 2011).

Mavlankar, A., et al.,"An Interactive Region-of-Interest Video Streaming System for Online Lecture Viewing," Information Systems Laboratory, Department of Electrical Engineering, Stanford University, Proc. of 18th International Packet Video Workshop, pp. 64-71, Dec. 2010.

European Search Report for EP Application No. 14174815.2, dated Sep. 2, 2014.

Giladi, A. et al, "Descriptions of Core Experiments on DASH Amendment," Systems subgroup/DASH, International Organisation for Stardardisation Organisation Internationale de Normalisation ISO/IEC JTC1/SC29/WG11 Coding of Moving Pictures and Audio, ISO/IEC JTC1/SC29/WG11 MPEG2013/N13977, Geneva, Switzerland, 24 pages (Nov. 2013).

Hirabayashi, M. et al, "Improvement on HEVC Tile Track for WD of 14496-15 AMD1," SONY Corporation Proposal, International Organisation for Stardardisation Organisation Internationale de Normalisation ISO/IEC JTC1/SC29/WG11 Coding of Moving Pictures and Audio, ISO/TEC JTC1/SC29/WG11 MPEG2014/M33083, Valencia, Spain, 4 pages (Mar. 2014).

Lee, et al., "Scalable roi Algorithm for H.264/SVC-based Video Streaming," Consumer Electronics, IEEE Transactions 57(2): 882-887 (2011).

Le Feuvre, J., et al., "Support for Efficient Tile Access in the HEVC File Format," Telecom Paris Tech, Canon Research Centre France (2013).

U.S. Final Office Action in U.S. Appl. No. 14/908,024, entitled "Providing Tile Video Streams to a Client." dated Jun. 1, 2018.

Non-Final Office Action for U.S. Appl. No. 14/908,024, dated Dec. 31, 2018.

Final Office Action for U.S. Appl. No. 14/908,024, dated Mar. 26, 2019.

Concolato, C., et al., "Usage of DASH SRD for HEVC Tiling," ISO Contribution ISO/IEC JTC1/SC29/WG11 MPEG2014 (2014).

Hirabayashi, M., et al., "Consideration on HEVC Tile Tracks in MPD for DASH SRD," ISO Contribution ISO/IEC JTC1/SC29/WG11 MPEG2014 (2014).

Sanchez, et al., "Low Complexity Cloud-video-mising using HEVC," 11th annual IEEE CCNC—Multimedia networking, services and applications, 214-218 (2014).

Tokumo, Y, et al., "Dash: Signaling Tile Encapsulation Modes," ISO Contribution ISO/IEC JTC1/SC29/WG11 MPEG2014 (2014).

Non-Final Office Action in U.S. Appl. No. 14/908,024, entitled "Providing Tile Video Streams to a Client." dated Aug. 25, 2017.

* cited by examiner

```
<?xml version="1.0" encoding="UTF-8"?>
<MPD
xmlns:xsi="http://www.w3.org/2001/XMLSchema-instance"
xmlns="urn:mpeg:dash:schema:mpd:2011"
xsi:schemaLocation="urn:mpeg:dash:schema:mpd:2011 DASH-MPD.xsd"
[...]>

<Period>

<!--Full Panorama -->

<AdaptationSet [...]>
      <EssentialProperty schemeIdUri="urn:mpeg:dash:srd:2014" value="1, 0, 0, 0, 0, 0, 1"/>
      <Representation id="panorama" bandwidth="5000000">
        <BaseURL>full_panorama-base.mp4</BaseURL>
      </Representation>
    </AdaptationSet>

<AdaptationSet [...]>
      <SupplementalProperty schemeIdUri="urn:mpeg:dash:srd:2014" value="1, 0, 0, 960, 1080, 1920, 1080, 1"/>
      <Representation id="tile1" bandwidth="5000000" depedencyId="panorama">
        <BaseURL>full_panorama-tile1.mp4</BaseURL>
      </Representation>
    </AdaptationSet>

<AdaptationSet [...]>
      <SupplementalProperty schemeIdUri="urn:mpeg:dash:srd:2014" value="1, 960, 0, 960, 1080, 1920, 1080, 1"/>
      <Representation id=" tile2" bandwidth="5000000" depedencyId="panorama">
        <BaseURL>full_panorama-tile2.mp4</BaseURL>
      </Representation>
    </AdaptationSet>

<!--ROI video which is a zoomed in part in motion of the full panorama-->

<AdaptationSet [...]>
      <ContentComponent id="0"  contentType="video"/>
      <ContentComponent id="1"  contentType="application"/>
      <EssentialProperty schemeIdUri="urn:mpeg:dash:srd:2014" value="1, 0, 0, 0, 0, 0, 2, dynamic"/>
      <Representation id="roi" bandwidth="5000000">
        <BaseURL>zoomed_part.mp4</BaseURL>
        <SubRepresentation level="0" contentComponent="0" bandwidth="128000" codecs=" hvc1.1.2.L93.B0 "> 826
        <SupplementalProperty schemeIdUri="urn:mpeg:dash:srd:2014" value="1, 0, 0, 1920, 1080, 3840, 2160, 1"/>
        </SubRepresentation>
        <SubRepresentation level="1" contentComponent="1" bandwidth="100" codecs=" coor "/> 828
      </Representation>
    </AdaptationSet>
  </Period>
</MPD>
                                              800
```

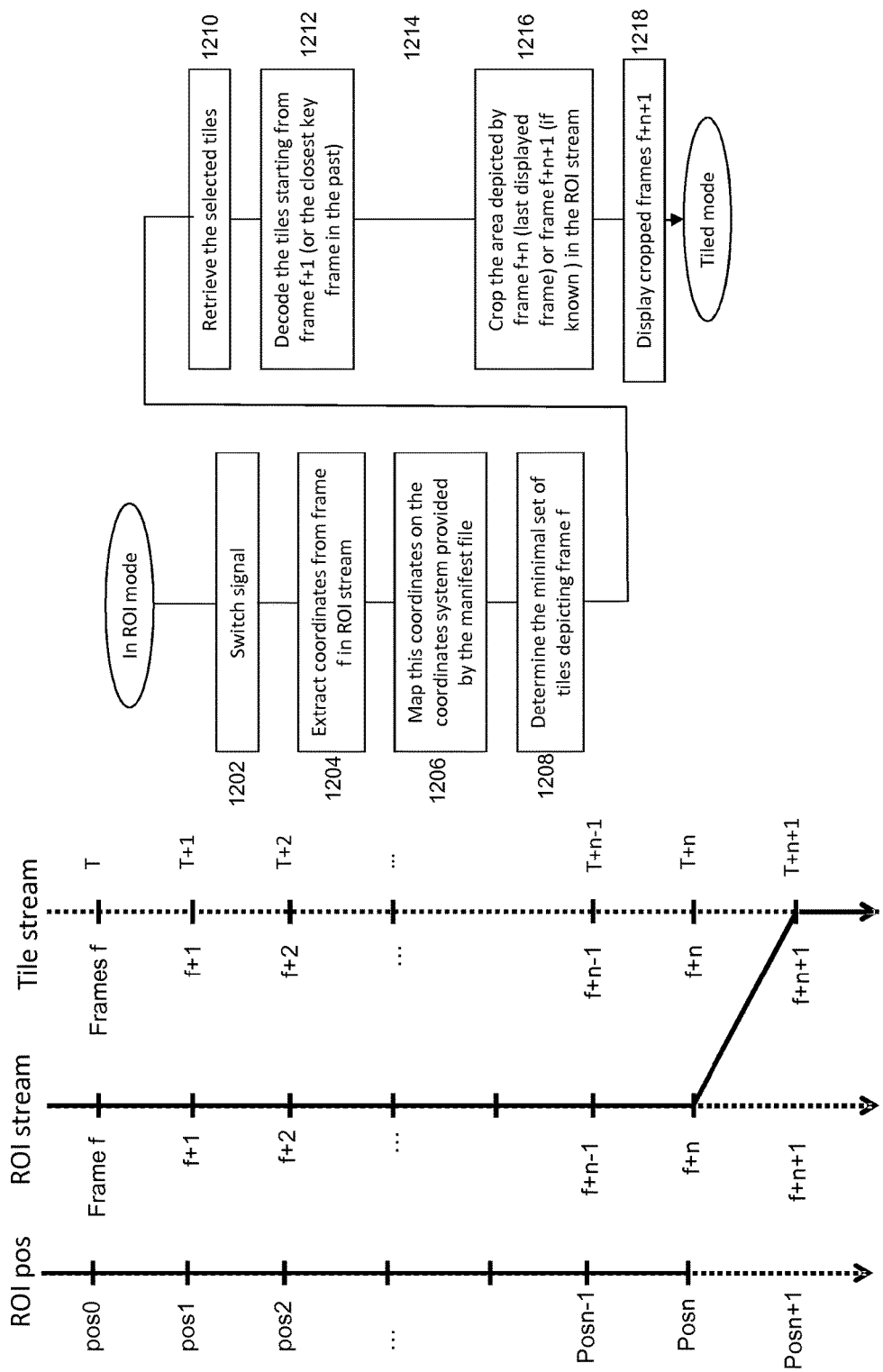

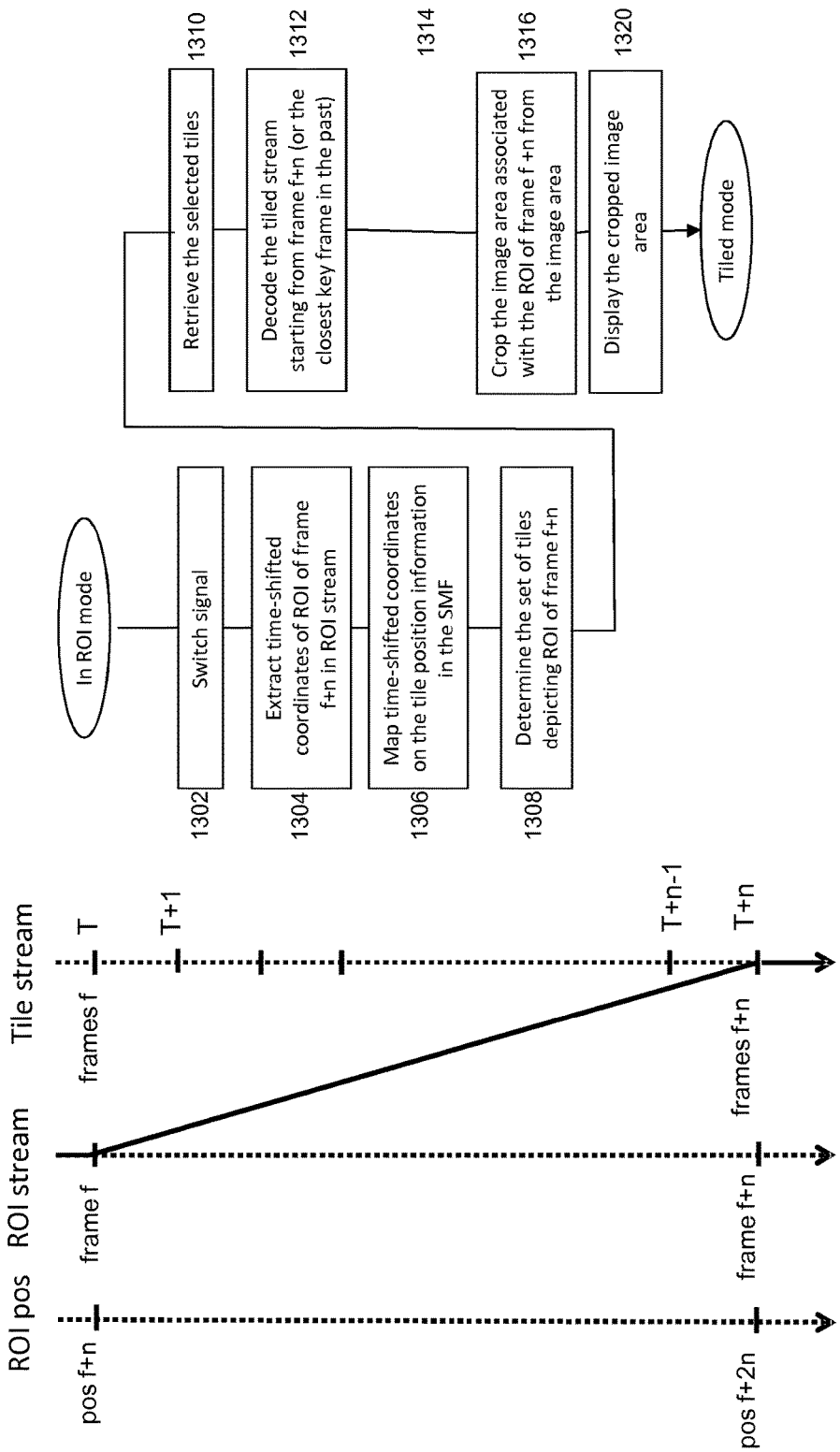

```
<ROI>
    <AbsoluteTime 1367584123.964324/>
    <PixelX1X2Y1Y2 0,1920,0,1080/>
</ROI>
<ROI>
    <AbsoluteTime 1367584125.516395/>
    <PixelX1X2Y1Y2 192,1728,108,972/>
</ROI>
<ROI>
    <AbsoluteTime 1367584127.234736/>
    <PixelX1X2Y1Y2 212,1748,108,972/>
</ROI>
```
(A)

```
<ROI>
    <RelativeTime 0/>
    <NormalizedXYzoom 0,0,1/>
</ROI>
<ROI>
    <RelativeTime 1.7523/>
    <NormalizedXYzoom 0,0,0.5/>
</ROI>
<ROI>
    <RelativeTime 5.89654/>
    <NormalizedXYzoom 0.5,0.5,0.5/>
</ROI>
```
(B)

```
<FrameNumber 1752/>
<PixelXYWH 50,70,640,480/>
<RadialNormalizedXYR 0.43,0.85,0.23/>
<SpeedPixelXdYdWdH> 2.3,0,-0.01,-0.01/>
```
(C)

Fig. 14

```
<?xml version="1.0" encoding="Iso-8859-1" ?>
<Pmt>
    <Pid>0x1B62</Pid>
    <TableId>0x2<//TableId>
    <SectionSyntaxIndicator>0x1</SectionSyntaxIndicator>
    <ProgramNumber>0x44D</ProgramNumber>
    <VersionNumber>0x1</VersionNumber>
    <CurrentNextIndicator>0x1</CurrentNextIndicator>
    <SectionNumber>0x0</SectionNumber>
    <LastSectionNumber>0x0</LastSectionNumber>
    <PcrPid>0x1B63</PcrPid>

<Stream>
    <StreamType>0x2</StreamType>
    <ElementaryPid>0x1B63</ElementaryPid>
    </Stream>

<Stream>
    <StreamType>0x3</StreamType>
    <ElementaryPid>0x1B64</ElementaryPid>
    </Stream>

<Stream>
    <StreamType>0x20</StreamType>
    <ElementaryPid>0x1B66</ElementaryPid>
    </Stream>
</Pmt>
```

Fig. 15

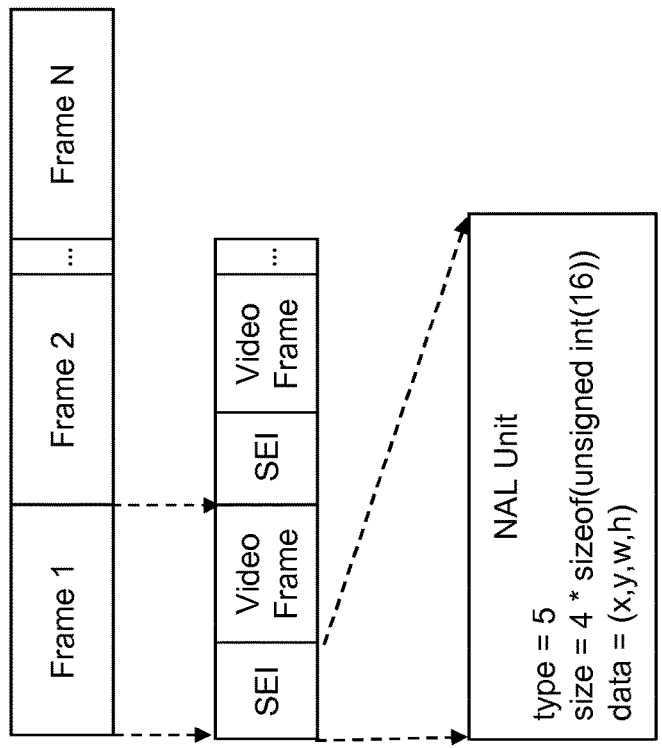

DETERMINING A REGION OF INTEREST ON THE BASIS OF A HEVC-TILED VIDEO STREAM

This application is the U.S. National Stage of International Application No. PCT/EP2015/064511, filed Jun. 26, 2015, which designates the U.S., published in English, and claims priority under 35 U.S.C. §§ 119 or 365(c) to European Application No. 14174815.2, filed Jun. 27, 2014.

FIELD OF THE INVENTION

The invention relates to determining a region-of-interest (ROI), and, in particular, though not exclusively, to a method for determining a region of interest on the basis of one or more HEVC-tiled video streams, a client device for determining and rendering said region-of-interest, a non-transitory computer-readable storage medium for storing video streams and data structures for determining and rendering a region-of-interest and a computer program product using such method.

BACKGROUND OF THE INVENTION

Over the past few years, advances in both camera and image processing technologies not only enable recording in ever higher resolutions, but also enable stitching the output of multiple cameras together, allowing a set of cameras that together record in full 360 degrees in even higher resolutions than 8K×4K.

These developments make it possible to change the way users experience video. Conventionally a broadcast of e.g. a football match comprises a sequence of camera shots carefully aligned and controlled by a director. In such a broadcast stream, each camera movement in the final stream corresponds to a physical alteration to the position, angle or zoom level of a camera itself. High-resolution panorama videos however, enable a user (and/or director) a certain degree of interaction with the video the user (and/or director) is watching (directing) without having to manipulate the camera in a physical sense. Using pan-tilt-zoom interaction, it is possible to extract from the high-resolution panorama video a sub-region of the video a user or director is interested in. This sub-region may be referred to as the region of interest (ROI).

Since in this particular use case a specific user is, at any given instant in time, only watching a subset of the full video panorama, bandwidth requirements can be reduced by sending only the part of the video the user is interested in. There are a number of techniques with which such functionality can be achieved. One of these techniques is the so-called tiled streaming technique, with which the full video panorama is divided into multiple independently encoded videos, whereby the client has multiple decoders allowing it to reconstruct any part of the full video panorama, if necessary by stitching together a number of such independent videos.

In most user scenarios, however, it is not necessary, or even desired, for a user to interact continuously with the video panorama. In the case of a football match for example, one can imagine that a user is only interested in interacting with the video at certain points in time, e.g. when an off-screen foul is made but the director decides to follow the ball instead. Most of the time, however, a user might just want to follow the director's lead. In such cases, using tiled streaming is not the most efficient method of streaming the video. One reason for this is the fact that the temporal and spatial predictions used in the encoding scheme are not optimized, since they are limited by the tile size. A second reason is that since any given set of tiles will almost never exactly comprise the ROI, some additional pixels/macroblocks are send which are not strictly necessary to reconstruct the given ROI.

In the article by Mavlankar, A. et al. "An interactive region-of-interest video streaming system for online lecture viewing," Packet Video Workshop (PV), 2010 18th International, vol., no., pp. 64-71, 13-14 Dec. 2010 the concept of a 'Tracking Tile' is described. This tracking tile is an independently encoded video, which consists of a continuously updated crop of the video panorama. By selecting the tracking tile mode, a user can passively follow a certain moving point of interest in the video panorama (e.g. the position of the ball in a football match), without having to actively navigate around the video panorama himself. One can imagine the position of the Tracking Tile within the video panorama to be controlled by a director similar to how regular broadcasts take place, or even be controlled by an automatic image recognition system.

While the use of a tracking tile provides users with the freedom to navigate around the video panorama and allowing them to passively follow a point of interest, the tracking tile concept described by Mavlankar et. al. does not provide the ability to perform a seamless transition from following a tracking tile to a user navigating through the panorama himself. If one imagines a user watching the Tracking Tile following the ball in a football match, moving across the video panorama, a user might suddenly want to move a little bit more to the left, for example to see the foul being made.

With the tracking tile scheme as described by Mavlankar et. al., seamless transitions are not possible, since the system does not know the location of the tracking tile in the video panorama at a given point in time. The user will therefore have to find the particular location in the panorama himself thereby disrupting the continuous experience. Switching between the tracking-tile mode and the user-control mode takes a significant time resulting in a waste of resources as video tiles are rendered and displayed that the user is not interested in.

Hence, there is a need in the art for improved methods and systems that enable efficient streaming of a ROI of a wide field-of-view image area to a client. Further, the is a need in the art enabling smooth or even seamless switching between streaming a ROI on the basis of a single stream to a client (in a non-tiled mode) and the streaming of a ROI on the basis of one or more separate tile streams to the client (in a tiled mode).

SUMMARY OF THE INVENTION

It is an objective of the invention to reduce or eliminate at least one of the drawbacks known in the prior art. In a first aspect the invention may relate to a method for determining and/or rendering a region-of-interest (ROI) for a client device on the basis of at least one HEVC-tiled (panorama) video stream.

In an embodiment, the method may comprise receiving, preferably at a client device, a ROI video stream for rendering a first ROI defining a first sub-region within the full image region of said HEVC-tiled video stream, the positions of HEVC tiles in said HEVC-tiled panorama video being defined by tile position information; providing, preferably at said client device, ROI position information associated with at least one video frame of said ROI video stream, said ROI position information comprising at least a first position of said first ROI; identifying, preferably by said client device, one or more HEVC tiles of said HEVC-tiled video stream on the basis of said ROI position information and said tile position information, preferably identifying one or more HEVC tiles that overlap with said first ROI; requesting, preferably by said client device, video data associated with said one or more identified HEVC tiles for rendering a second ROI defining a second sub-region within the full image region of said HEVC-tiled video stream. It should be noted that although the best mode of the invention is defined in terms of a client device executing the steps of the method, the invention also envisages embodiments wherein certain steps of the method according to the invention are executed by other entities than the client device. For instance if ROI position information and the tile position information is provided to another entity than the client device (e.g. a device connected to the client device, such as a server computer), this other entity (the other device) may execute the step of identifying as disclosed above.

Hence, a ROI stream may comprise content (e.g. video data) of a sub-region (a ROI) of the full image region of a HEVC-tiled video stream. The HEVC-tiled video may be a high-resolution or an ultra-high resolution video. Alternatively, a HEVC-tiled stream may be formed (composed/stitched) out of a number of difference videos, e.g. different camera angles. During playout of the ROI stream, the position of the ROI (the spatial position or orientation of the sub-region within the HEVC-tiled image region of the HEVC-tiled stream) may change in time.

When switching from rendering a ROI on the basis of a non-tiled ROI stream (the ROI streaming mode), e.g. a conventional non-tiled MPEG stream, to rendering a ROI on the basis of one or more HEVC-tiled streams also referred to as HEVC tiles (the tiled streaming mode), ROI position information comprising the position (i.e. ROI coordinates) of at least one image frame of a ROI video stream may be used to determine HEVC-encoded video data of one or more HEVC tiles that the client device may use (e.g. request, retrieve and render) when starting the HEVC tile streaming mode. The position of the ROI of a ROI stream (also referred to as ROI video stream) may be provided on frame level, i.e. video frames that have been received by the client device, so that a smooth or seamless transition to the tiled streaming mode can be realized.

The HEVC standard supports so-called HEVC tiles. The HEVC encoder may be configured to divide video frames in a video in so-called HEVC tiles, wherein a HEVC tile is rectangular area defined by a particular grouping of CTUs. The HEVC tiles may divide the image area of the panorama video into multiple adjacent rectangular regions, wherein the boundaries of the HEVC tiles are defined by HEVC tile boundaries in the column and row direction. In this application, a HEVC encoded video stream (also referred to as HEVC stream, HEVC video or HEVC video stream) comprising HEVC tiles may be referred to as a HEVC-tiled video stream. The HEVC tiles may be separately requested and retrieved and are therefore also referred to as HEVC tile streams. Together these HEVC tile streams/HEVC tiles form the HEVC encoded video.

HEVC tiles were originally introduced in the HEVC standard for encoding and decoding of the video data using multi-core processors so that tiles in a HEVC-tiled stream may be processed (encoded and decoded) in parallel. HEVC-tiles may also be used for retrieving and/or playout of only a subset of the HEVC tiles of a HEVC-tiled stream. Such subset may e.g. relate to a region-of-interest (ROI), e.g. a subregion, in/of the image area (full image region) of the panorama video (the HEVC-tiled video). In that case, the HEVC tiles should be independently encoded over time so that the decoder is able to decode only a subset of the HEVC tiles over multiple frames. In order to generate such sets of independently decodable HEVC tiles, the HEVC standard allows an HEVC encoder to be configured for restricting the temporal predictions in the video coding (e.g. motion vectors and in-loop filters) within the boundaries of one or more HEVC tiles. The processing of HEVC tiles by a single HEVC decoder provides a significant advantage in terms of resources when compared to tiling schemes described in the prior art, using other codecs which may require a separate decoder (or decoder instance) for each HEVC tile stream.

The concept of tiles as described in this disclosure may be supported by different video codecs. For example the High Efficiency Video Coding (HEVC) standard allows the use of independently decodable tiles (HEVC tiles). HEVC tiles may be created by an encoder that divides each video frame of a media stream into a number of rows and columns ("a grid of tiles") defining tiles of a predefined width and height expressed in units of coding tree blocks (CTB). An HEVC bitstream may comprise decoder information for informing a decoder how the video frames should be divided in tiles. The decoder information may inform the decoder on the tile division of the video frames in different ways. In one variant, the decoder information may comprise information on a uniform grid of n by m tiles, wherein the size of the tiles in the grid can be deduced on the basis of the width of the frames and the CTB size. Because of rounding inaccuracies, not all tiles may have the exact same size. In another variant, the decoder information may comprise explicit information on the widths and heights of the tiles (e.g. in terms of coding tree block units). This way video frames may be divided in tiles of different size. Only for the tiles of the last row and the last column the size may be derived from the remaining number of CTBs. Thereafter, a packetizer may packetize the raw HEVC bitstream into a suitable media container that is used by a transport protocol.

Other video codecs that support independently decodable tiles include the video codec VP9 of Google or—to some extent—the MPEG-4 Part 10 AVC/H.264, the Advanced Video Coding (AVC) standard. In VP9 coding dependencies are broken along vertical tile boundaries, which means that two tiles in the same tile row may be decoded at the same time. Similarly, in the AVC encoding, slices may be used to divide each frame in multiple rows, wherein each of these rows defines a tile in the sense that the media data is independently decodable. Hence, in this disclosure the term "HEVC tile" is not restricted to only tiles according to the HEVC standard, but generally defines a subregion of arbitrarily shape and/or dimensions within the image region of the video frames wherein the media data within the boundaries of the tile are independently decodable. In other video codecs other terms such as segment or slice may be used for such independently decodable regions. It should thus further be noted that the invention is equally suitable for use with video codecs that are different from HEVC (e.g. VP9) or are (future) derivatives from HEVC, as long as these codecs have the characteristic that they are suitable for encoding a video, whereby different regions (sub areas) of images representing the video can be independently encoded in a single encoding process, and whereby the independently encoded regions can be decoded in a single decoding process. The term independently refers to the notion that the coding is performed in a manner that no encoding dependencies exist between these regions.

In an embodiment, said method may further comprise: rendering said second ROI on the basis of said requested video data and said ROI position information.

In an embodiment, providing said ROI position information may further comprise: providing first ROI coordinates of at least a first image frame of said ROI video stream, said first ROI coordinates defining a first position of said first ROI at a first time instance of receiving an instruction for rendering a second ROI, preferably said instruction being a user-initiated instruction. In this embodiment, the ROI coordinates of a frame that are processed by the client device at the moment the client device is instructed, e.g. via a user-interaction, may be used to determine the one or more HEVC tiles that are needed for switching to the HEVC tile streaming mode (i.e. the rendering of a user-initiated ROI on the basis of HEVC tiles instead of a ROI stream that renders a predetermined ("director-cut") ROI).

In an embodiment said instruction may comprise a ROI vector for indicating a change of the position of said first ROI, said first ROI coordinates and said ROI vector being used for identifying said one or more HEVC tiles. The ROI vector may be associated with a certain user-interaction, e.g. panning, zooming and/or tilting, and may be used for selecting a tile representation that is suitable for the requested user-interaction.

In an embodiment, providing said ROI position information may further comprise: providing second ROI coordinates of at least a second image frame of said ROI video stream, said second ROI coordinates defining a second position of said first ROI at a second time instance of processing (e.g. receiving, buffering and/or decoding) said ROI video stream by said client device; said first and second ROI coordinates being used for identifying said one or more HEVC tiles. In this embodiment, detrimental effects due to movements of the ROI between the request of the HEVC tile streams and the processing of the HEVC tile streams by the client device may be reduced.

In an embodiment, wherein said requested video data are HEVC-encoded, said rendering of said second ROI may comprise: forming a decoded image region on the basis of the requested HEVC-encoded video data; and, optionally, cropping said second ROI out of said decoded image region. The video data of the determined HEVC tiles may be used to form a second sub-region in the image region. The ROI coordinates may be used to create (crop) a second ROI out of the second sub-region so that a smooth transition to the tiled streaming mode is ensured.

In an embodiment, providing ROI position information may further comprise: providing look-ahead position information associated with at least one video frame of said ROI video stream that is not yet received by said client device at the moment said look-ahead position information is provided to said client device, said look-ahead position information comprising a second position of a second ROI in said full image region.

ROI position information may be time-shifted so that a client device may receive ROI position information ahead in time. This way the client may request the correct HEVC tile streams even when the ROI is very dynamic (e.g. when the spatial orientation within the full image region of the HEVC-tiled (panorama) video, of the subregion associated with the ROI, changes frequently. This embodiment is particularly advantageous when dealing with the ROI stream comprising a dynamic ROI trajectory.

The time-shift compensates the movement of the ROI during the time period between requesting the HEVC tile streams and processing the HEVC tile streams by the client device. This way, the sub-region formed by the requested HEVC tile streams always comprises the requested ROI.

In an embodiment, said look-ahead position information may comprise one or more time-shifted first ROI coordinates of one or more image frames in said ROI video stream that are not yet received by said client device, preferably said time-shifted first ROI coordinates being provided to said client device prior to said one or more image frames, more preferably said time-shifted ROI coordinates being further associated with time-shift information, preferably a time stamp for determining a time-shift.

In an embodiment, at least part of said ROI position information is transported in the bitstream of said ROI video stream to said client device, preferably a SEI message or a ROI coordinates flag defining the location of said ROI coordinates in said bitstream;

In an embodiment, at least part of said ROI position information may be transported in an MPEG transport stream to the client device, preferably in elementary transport stream in said MPEG transport stream; or, as a DVB-defined SAD (Synchronised Auxilary Data) packet in said MPEG transport stream, optionally said SAD packet comprising a time-shifted ROI coordinate.

In an embodiment, at least part of said ROI position information may be transported in a predefined box in an MPEG-4 stream, preferably in a moov, trak and/or stbl box of an MPEG-4 stream;

In an embodiment, at least part of said ROI position information may be transported as a watermark to said client device, preferably as a watermark in said ROI video stream.

In an embodiment, at least part of said tile position information is provided to said client device in said HEVC-tiled video stream, preferably in a moov or moof box said HEVC-tiled video stream In an embodiment, the video data of HEVC tiles may be are stored as separate video tracks in said recording area; and at least one base track comprising one or more extractors, wherein an extractor points to a video track.

In an embodiment, at least part of said tile position information may be provided in a spatial manifest file to said to said client device, said manifest file comprising one or more stream identifiers for locating one or more delivery nodes that are configured for delivering said HEVC-tiled video stream and/or said ROI video stream to said client device.

In an embodiment, said video data associated with said one or more identified HEVC tiles may be requested on the basis of a spatial manifest file comprising at least one or more HEVC tile identifiers, preferably one or more URLs, and said tile position information; and, optionally one or more ROI video stream identifiers associated with one or more ROI video streams, preferably at least of said one or more ROI video stream identifiers being associated with a dynamic indicator for indicating that the ROI position information changes in time.

In an embodiment said HEVC-encoded video data may be requested on the basis of a spatial manifest file, said spatial manifest file comprising one or more HEVC tile representations, each associated with a HEVC-tiled video stream, a HEVC tile representation comprising one or more HEVC tile identifiers, preferably at least part of one or more URLs, associated with one or more HEVC-tiled streams and/or one or more HEVC HEVC tile streams. Each HEVC tile representation may be associated with its own HEVC tiled video stream (for instance when each representation relates to a different zoom level and not each zoom level encompasses the same full image region), and/or with a single HEVC video (file or stream), for instance if each of the zoom levels encompass the same full image region.

In a further aspect, the invention may relate to a client device for rendering a region of interest (ROI) wherein said client may be configured for: receiving a ROI video stream for rendering a first ROI defining a first sub-region within the full image region of a HEVC-tiled video stream, the positions of HEVC tiles in said HEVC-tiled video stream being defined by tile position information; providing ROI position information associated with at least one video frame of said ROI video stream, said ROI position information comprising at least a first position of said first ROI; identifying one or more HEVC tiles of said HEVC-tiled video stream on the basis of said ROI position information and said tile position information, preferably one or more HEVC tiles that overlap with said first ROI; and, requesting video data, preferably comprised in one or more HEVC tile streams, associated with said one or more identified HEVC tiles for rendering a second ROI defining a second sub-region within the full image region of said HEVC-tiled video stream; and, optionally, rendering said second ROI on the basis of said requested video data and said ROI position information.

In another aspect, the invention may relate to a non-transitory computer-readable storage medium for storing video data, wherein said storage medium comprising a recording area comprising: video data of a ROI stream wherein said ROI defines a sub-region within the full image region of said HEVC-tiled video stream; and, position information, preferably coordinates, of said sub-regions in said full image region.

In an embodiment, said position information may be inserted in the bitstream of said ROI stream, preferably a SEI message or a ROI coordinates flag defining the position of said ROI coordinates in said bitstream;

In an embodiment, said video data may be recorded as an MPEG transport stream, wherein at least part of said ROI position information is contained in said MPEG transport stream In an embodiment, said ROI position information may be contained in said MPEG transport stream as an elementary transport stream or, as a DVB-defined SAD (Synchronized Auxiliary Data). In a further embodiment, said SAD packet may comprise one or more time-shifted ROI coordinates;

In an embodiment, said video data may be recorded as an MPEG4 stream, at least part of said ROI position information being contained in said MPEG4 stream in a predefined box, preferably in a moov, trak and/or stbl box;

In embodiment, at least part of said ROI position information may be inserted as a watermark in said video data.

In a yet a further aspect, the invention may relate to a non-transitory computer-readable storage media comprising a stored data structure, preferably at least part of a spatial manifest file, and preferably suitable for use by a client device as described above, wherein said data structure may comprise: one or more HEVC tile representations, each representative of a HEVC-tiled video stream, a HEVC tile representation comprising one or more HEVC tile identifiers for identifying one or more HEVC tiles, tile position information defining the position of the HEVC tiles in a HEVC-tiled video stream; the data structure may further comprise at least one ROI stream identifier, preferably an URL, of a ROI stream comprising ROI position information, said ROI stream comprising video data for rendering a first ROI defining a sub-region within the full image region of said HEVC-tiled video stream. Alternatively or additionally the data structure may comprise ROI positioning information defining the position of said sub-region within the full image region of said HEVC-tiled video stream. This option is foreseen in those cases, wherein for instance the ROI stream does not comprise ROI positioning information. In a preferred embodiment the data structure is arranged for retrieving tiles as HEVC tiled streams based on a HTTP adaptive streaming protocol.

The invention may also be related to computer program product comprising software code portions configured for, when run in the memory of a computer, executing the method steps according to any of the above claims.

The invention will be further illustrated with reference to the attached drawings, which schematically will show embodiments according to the invention. It will be understood that the invention is not in any way restricted to these specific embodiments.

BRIEF DESCRIPTION OF THE DRAWINGS

FIGS. 8A and 8B depicts a spatial manifest file for managing a ROI streaming process according to an embodiment of the invention.

FIGS. 12A and 12B depict schematics of a process for seamless switching between a non-tiled ROI streaming mode and a tiled ROI streaming mode according to an embodiment of the invention.

FIGS. 13A and 13B depict schematics of a process for seamless switching between a non-tiled ROI streaming mode and a tiled ROI streaming mode according to another embodiment of the invention.

FIG. 14 depicts ROI data formats according to various embodiments of the invention.

FIG. 15 depicts a data format for transporting ROI data as an elementary stream in an MPEG transport stream according to an embodiment of the invention.

FIGS. 16A and 16B depict a data format for transporting ROI data in the encoded bitstream of MPEG stream.

DETAILED DESCRIPTION

Figure 1:
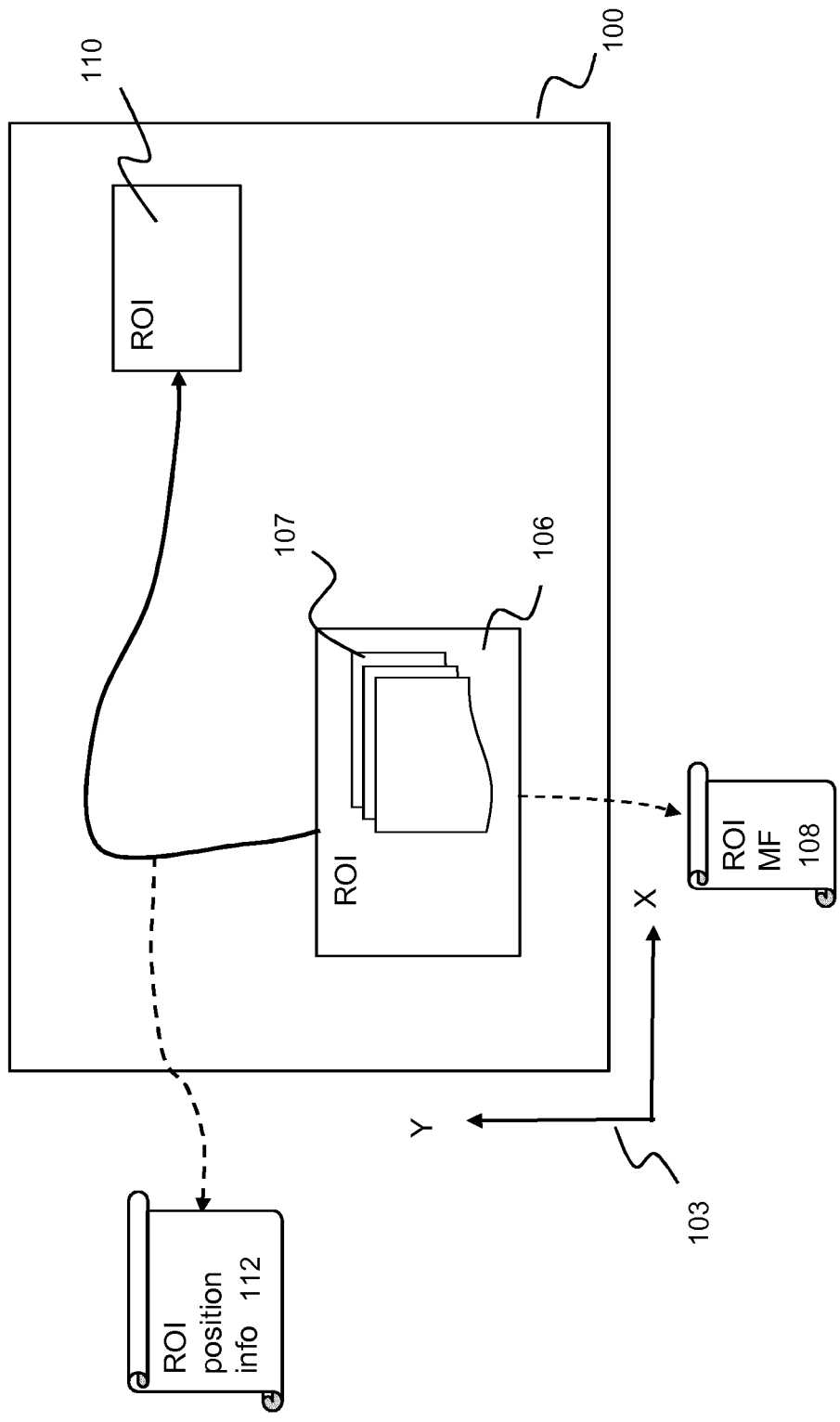
FIG. 1 depicts a region-of-interest (ROI) streaming process according to an embodiment of the invention.

FIG. 1 depicts a region-of-interest (ROI) streaming process according to an embodiment of the invention. In this application a ROI is defined as a sub-region 106,110 of an image region 100, e.g. a wide field-of-view (panoramic) image region of a source video. The source video may be formed on the basis of (e.g. combining) one or more high-resolution video files that may have: a wide field-of-view, different camera positions, different camera angles, 3D, etc. The position and size of the ROI within the image region 100 may be defined on the basis of ROI coordinates 103. As shown in FIG. 1, the ROI may follow a ROI trajectory wherein the first ROI is at a first time instance at a first position 106 within the image area and at a second time instance at a second position 110.

The ROI may be pre-selected using a tracking algorithm or a camera operator. A stream may be generated by cropping the ROI out of the image region of decoded frames of the source video and encoding the cropped regions in a separate stream, e.g. an MPEG and/or DVB encoded stream. This stream may be referred to as a ROI stream 107. The coordinates of the cropped region may be referred to as ROI coordinates. For example, the source video may relate to a high-resolution, wide field-of-view (panorama) video of a soccer match and the ROI stream may be generated on the basis of the source video by cropping the ROI associated with the ball out of the decoded frames of the source video.

Alternatively, the ROI stream may be generated as a separate stream originating e.g. from a broadcast camera that follows the ball. In that case, an image processor may use well known image recognition and tracking algorithms in order to correlate the (limited) field-of-view of the broadcast video with a particular sub-region (the ROI) of the wide field-of-view image region of the source video. This way, the image processor may relate so-called ROI coordinates to the frames in the ROI stream.

In an embodiment, the ROI stream may be transmitted using a broadcast technology such as DVB or a multicast technology. In another embodiment, the ROI stream may be transmitted to the client on the basis of an adaptive streaming protocol such as HTTP Adaptive Streaming (HAS). To that end, a manifest file 108 may define segment identifiers, e.g. (part of) an URL, for locating one or more delivery nodes that are configured to deliver the segments to a client. Examples of adaptive streaming protocols include Apple HTTP Live Streaming [http://tools.ietf.org/html/draft-pantos-http-live-streaming-13], Microsoft Smooth Streaming [http://www.iis.net/download/SmoothStreaming], Adobe HTTP Dynamic Streaming [http://www.adobe.com/products/httpdynamicstreaming], 3GPP-DASH [TS 26.247 Transparent end-to-end Packet-switched Streaming Service (PSS); Progressive Download and Dynamic Adaptive Streaming over HTTP] and MPEG Dynamic Adaptive Streaming over HTTP [MPEG DASH ISO/IEC 23001-6]. HTTP allows an efficient, firewall-friendly and scalable scheme for delivering video streams (and segments) to clients. In an embodiment, the ROI stream may be encoded using the HEVC codec.

In the above examples, ROI position information 112 may be determined when the ROI stream is formed. The ROI position information defines the positions of the (limited field-of-view) image region of ROI video within the wide field-of-view image region of the source video. Hence, the video frames of the ROI video may define a sub-region within the image region of the video frames of the source video. The ROI position information may comprise ROI coordinates that define the position and the size of the ROI within the image region of the source video. In an embodiment, for each frame (or set of frames) in the ROI stream, ROI position information (ROI coordinates) may be generated. During the playout of the ROI stream, the position of the ROI may move within the full image region of the source video. During the playout of the ROI stream, the ROI coordinates may change in time thereby forming a stream of ROI coordinates. The stream of ROI coordinates may define a spatial trajectory within the image area of the source video.

In an embodiment, the ROI position information may comprise a stream of ROI coordinates that may be sent (in sync) with the ROI stream to a client. The ROI position information may be sent in a separate communication channel to the client. Alternatively, the ROI position information may be transported as part of the transport container of the video frames to the client. Examples will be described hereunder in more detail.

The trajectory of the ROI in time within the image region of the source video is illustrated in FIG. 1. The first sub-region (representing the ROI) may start at a first time instance at a first ROI position 106 associated with first ROI coordinates and a first ROI size and after some time, the sub-region may move to a second ROI position 110 associated with second ROI coordinates and second ROI size. During the trajectory the ROI may zoom into a predetermined part of the image region of the source video. Hence, the ROI depicted in FIG. 1 is a dynamic ROI in the sense its position within the image region of the source file and its size relative to the image region of the source file may change in time.

The streams depicted in FIG. 1, the first (source) stream and second (ROI) stream, may be delivered to client for playout using an adaptive streaming protocol such as an HTTP adaptive streaming (HAS) protocol. In that case, the spatial relation between the first (ROI) video stream and the second (wide field-of-view) video stream may be described in a special data structure, which hereafter will be referred to as a spatial manifest file (SMF). The SMF may comprise stream identifiers (e.g. (part of) an URL), which a client may use in order to locate and access one or more delivery nodes (e.g. media servers), which are capable of transmitting the streams to the client. In addition to the stream identifiers, the manifest file may comprise position information, which describes the spatial relation of the image regions of the video streams within a reference system.

Typically, client devices have limited rendering and bandwidth capabilities and thus may not be capable of receiving and rendering the full image region of the source video in high-resolution quality. At least part of this problem may be solved by using a so-called tiled streaming technique wherein the source stream (typically a panorama video stream) is spatially divided into a set of tile streams. The tile streams are then typically separately encoded, and do not result from a single encoding process of a source video. The client may reconstruct any part of the source stream by requesting a subset of the tile streams of the panorama video. Because in the prior art encoding schemes these tile streams are independently encoded, upon reception of these (encoded) tile streams, the client needs to decode the tile streams using multiple decoder instances and stitch the decoded video data of the tile streams together before the video data can be displayed to a user.

The use of multiple decoder instances for one client however costs a large amount of processor resources. Especially when using a large amount of tiles, the client process becomes very complex and extremely resource intensive. This problem may be solved by using the HEVC video compression standard.

Figure 2:
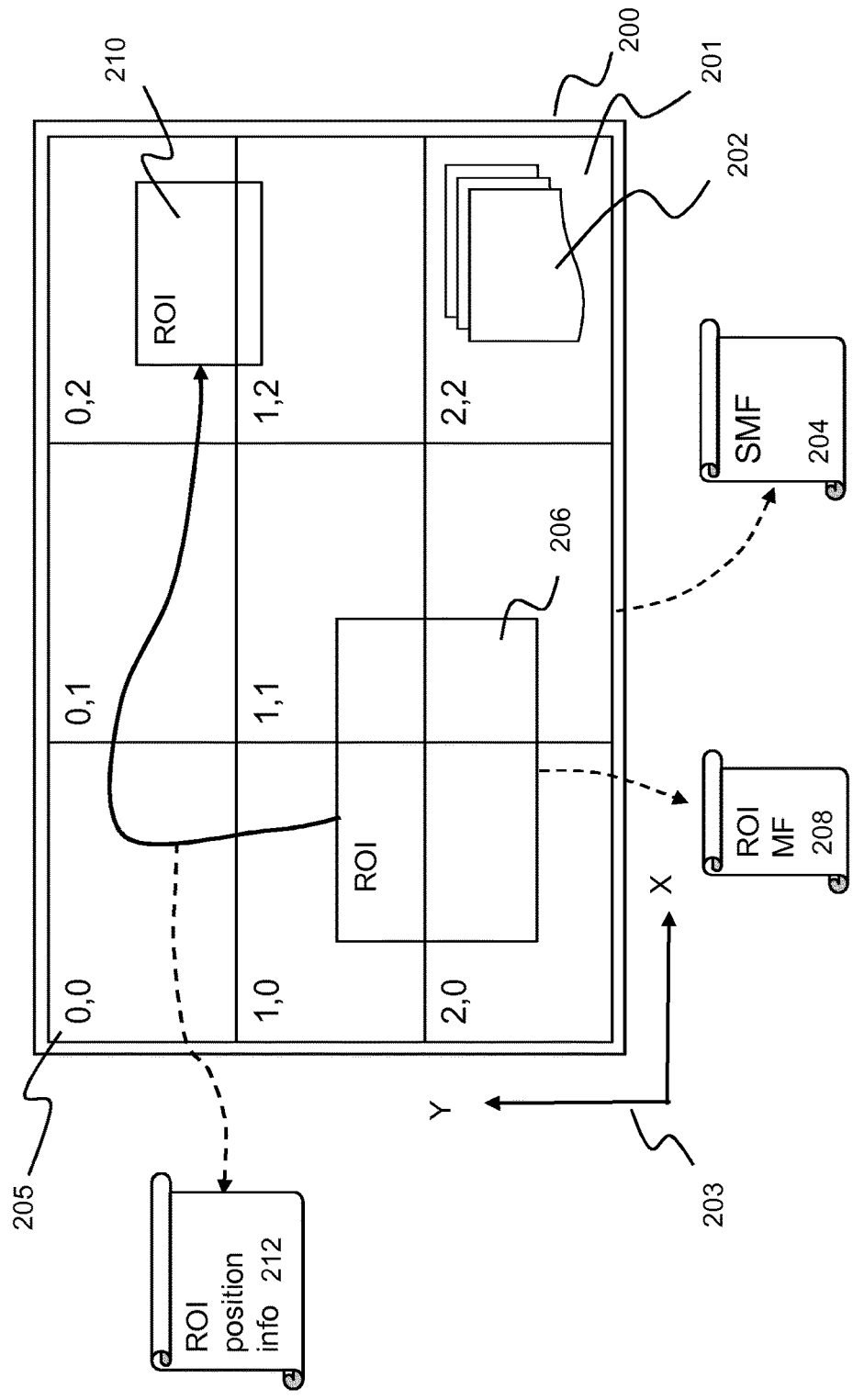
FIG. 2 depicts a ROI streaming process according to an embodiment of the invention.

FIG. 2 depicts a ROI streaming process according to an embodiment of the invention, wherein the source file (video) may be encoded as a HEVC-tiled stream.

In HEVC a video frame is partitioned in so-called coding tree units (CTU), which is the basic processing unit used in the HEVC standard for the decoding process. Further, the HEVC encoder may be configured to divide a video frame 200 in the HEVC stream in so-called HEVC tiles 201, wherein a HEVC tile is rectangular area defined by a particular grouping of CTUs. The HEVC tiles may divide e.g. the image area of a panorama video into multiple adjacent rectangular regions (which may be of different size), wherein the boundaries of the HEVC tiles are defined by HEVC tile boundaries in the column and row direction. In this application, a HEVC encoded video stream comprising one or more HEVC tiles may be referred to as a HEVC-tiled stream.

The HEVC tiles are introduced in the HEVC codec for parallel encoding and decoding of the video data (using multi-core processors), so that efficient processing of the video data may be achieved. This way, a HEVC-tiled video may be decoded efficiently using a single HEVC decoder. Additionally, HEVC tiles may also be used for playout of only a subset of the HEVC tiles that are contained in a HEVC-tiled stream.

To that end, the HEVC standard allows signalling of spatial and temporal constraints associated with each HEVC tile in order to ensure total independency of the encoding and decoding processes. In particular, the HEVC standard allows for restricting the well-known spatial and temporal predictions in the video coding (e.g. motion vectors and in-loop filters) within the boundaries of an HEVC tile. Using these spatial and temporal constraints, an HEVC encoder may be configured to generate independently decodable HEVC-tiles than can be individually stored and accessed by a streaming client.

The position of the HEVC tiles in the HEVC-tiled stream may be determined by tile position information 205, which may be defined on the basis a coordinate system 203. A position of the HEVC tile thus refers to the spatial position or orientation of the image area (subregion) of a tile within the full image region (area) of the HEVC-tiled stream.

The location of one or more moving ROIs 206,210 in the image region of the HEVC stream may be defined by ROI position information 212 in a similar way as described with reference to FIG. 1. The ROI position information may change in time thereby defining a trajectory of a moving ROI within the image region of the source file. The coordinate system that is used for defining the tile position information may also be used in order to determine the ROI coordinates of the ROI in the ROI stream as described in detail with reference to FIG. 1. In case the image region relates to a 2D or 3D image region, a Cartesian coordinate system may be used. Alternatively, in case the image regions relates to a curved image region other non-Cartesian, curvilinear coordinate systems may be used, e.g. cylindrical, spherical or polar coordinate system.

Figure 3:
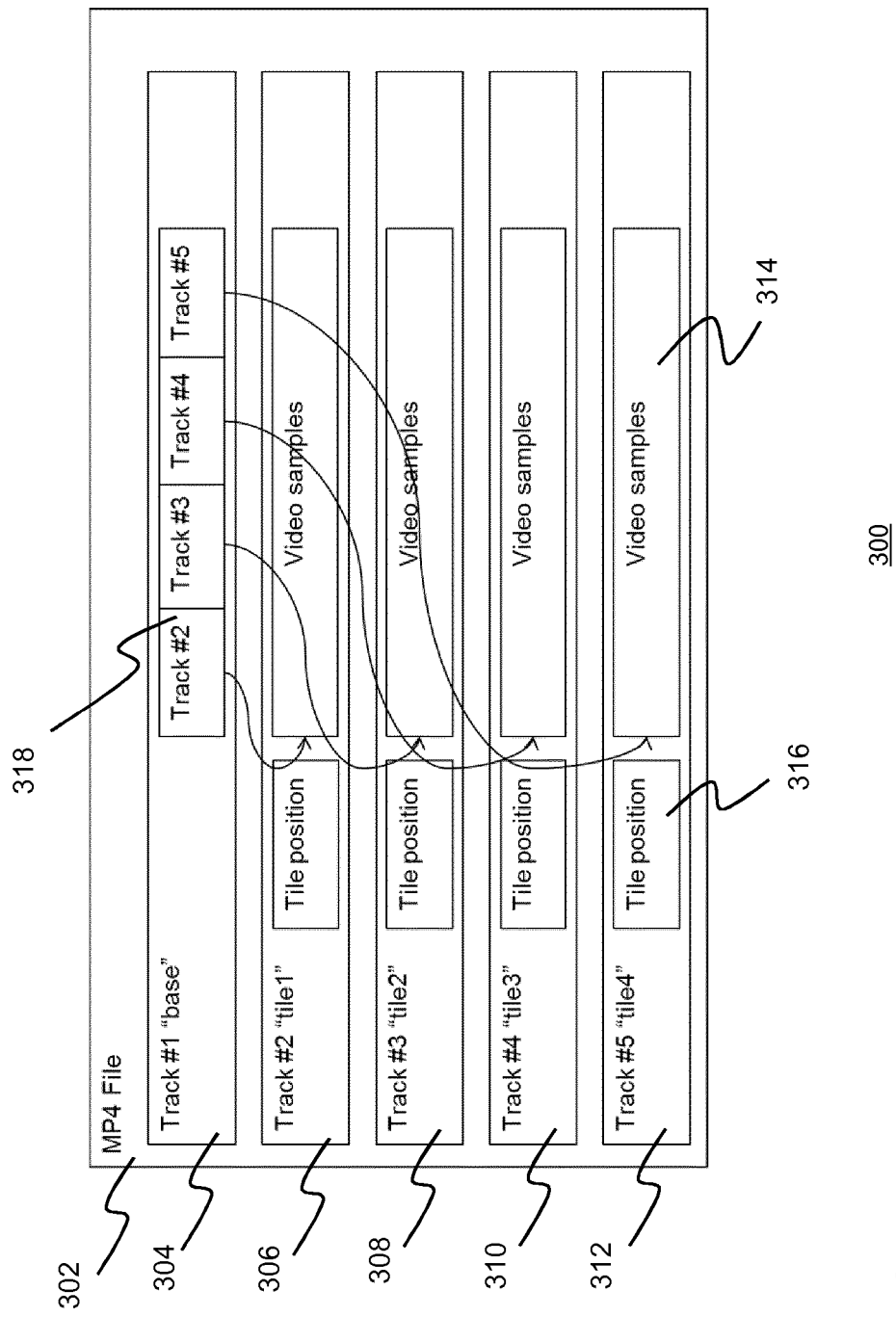
FIG. 3 depicts a data format of an HEVC encoded MPEG file for use in a ROI streaming process according to an embodiment of the invention.

In an embodiment, an HEVC encoder may be configured for generating HEVC tiles 202 associated with a HEVC-tiled video stream such that an HEVC tile can be independently stored and independently decoded by an HEVC decoder. For example, FIG. 3 depicts an example of data format 300 for a HEVC-tiled MPEG file or stream 302 which may be used in a ROI streaming process according to an embodiment of the invention. In an embodiment, the independently decodable video data associated with an HEVC tile (as comprised in a HEVC tile stream) may be stored as a track 304-312. In particular, video data 314 associated with an HEVC tile may be stored as a so-called (HEVC) tile track 306-312.

When generating video data for a tile track, the spatial and temporal predictions for the video coding (e.g. motion vector and in-loop filters) are fully kept within the boundaries of one HEVC tile. This way, there is no spatial decoding dependency between video data of one HEVC tile in a video frame and the other HEVC tiles in the video frame. In addition, there is no spatial decoding dependency between video data of one HEVC tile in a video frame and other HEVC tiles in earlier video frames.

In an embodiment, a tile track may further comprise tile position information 316. The decoder may use the tile position information in order to determine which track it needs to extract from the HEVC stream for decoding. In an embodiment, tile position information in a track may comprise a tile origin and tile size information (e.g. width and height parameters) in order to position the tile in a reference space defined by a coordinate system as described with reference to FIGS. 1 and 2.

In an embodiment, the data format 300 of FIG. 3 may comprise a so-called base track 304. The base track may comprise extractors 318, wherein an extractor defines a reference to one or more corresponding tile tracks. By parsing the base track, the decoder may replace an extractor with audio and/or video data of a tile track it refers to. If a particular video application does not require a particular tile, the decoder may simply ignore its corresponding extractor. If video data of a particular track is not received or retrieved. The absence of such track may be interpreted by the HEVC decoder as "missing data". As an HEVC tile may be decoded independently from the other HEVC tiles, so the absence of data from one or more tracks ("missing data") does not prevent the decoder from decoding other tracks that can be retrieved.

In an embodiment, the data format of FIG. 3 may further comprise a ROI track comprising ROI position information, e.g. the ROI coordinates of the (limited field-of-view) image region of a ROI stream within the full image region of the HEVC-tiled stream. The ROI position information may comprise ROI coordinates, which may be defined on the basis a coordinate system 103 associated with the full image region of the HEVC-tiled stream. In a further embodiment, the ROI track may comprise video data of the ROI.

The data format depicted in FIG. 3 may also be used in order to store HEVC tiles of a HEVC-tiled stream as independent HEVC tile streams such that a client in a client device may use a SMF in order to individually request a HEVC tile stream from a delivery node (e.g. media server). To that end, the SMF may comprise one or more tile identifiers (e.g. at least part of an URL or an URI). A tile identifier may be used by the client for locating one or more delivery nodes (e.g. one or more media servers or a CDN)

that are configured to store and deliver HEVC-tiled video data. A HEVC-tiled stream comprising one HEVC tile may be referred to as a HEVC tile stream.

The HEVC tile streams and the ROI stream depicted in FIG. 2 may be delivered to a client device for playout using an adaptive streaming protocol such as an HTTP adaptive streaming (HAS) protocol. To that end, a HEVC tile stream may be temporally divided in temporal segments of a predetermined period. Hence, in that case the SMF may further comprise temporal segment identifiers associated with a HEVC-tiled stream so that the client device may sequentially request temporal segments of a HEVC-tiled stream from one or more delivery nodes in the network. The temporal and spatial relation between the first (ROI) video stream and the one or more HEVC-tiled video streams may be defined in a spatial manifest file (SMF) 204. In case of an MPEG-DASH streaming protocol a manifest file may also be referred to as a media presentation description (MPD).

A SMF may comprise one or more HEVC stream identifiers, one or more ROI stream identifiers and/or one or more HEVC tile identifiers. The SMF may further comprise position information describing the spatial relation between the one or more ROI streams and the one or more HEVC stream within a particular coordinate system. In another embodiment, the position information may further comprise information describing the spatial relation between the one or more HECV tiles within the coordinate system. Spatial information on the HEVC tiles may also be referred to as tile position information. More detailed examples of spatial manifest files according various embodiments of the invention are described hereunder with reference to FIG. 5-8.

Different HEVC tile representations or—in short—tile representations (representing e.g. tile size, 2D and 3D formats, different video and/or audio qualities (e.g. SD/HD/UHD, bitrates, etc.), different resolutions, different field-of-views, camera angles, etc.) of one source file may be generated. For each tile representation, the video frames of the source file may be encoded into an HEVC-tiled video file (the HEVC-tiled video file is also referred to as a HEVC-tiled video stream, as it in essence contains HEVC encoded video data which may be streamed to a client device) comprising a predetermined number of (preferably independently) decodable HEVC tiles wherein each HEVC tile 201 may represents a subregion of the full image region of the HEVC-tiled video file. An HEVC encoder may be used in order to generate a HEVC-encoded MPEG stream comprising HEVC tiles on the basis of the video frames of the source file.

On the basis of the tile position information (comprising the coordinates of the HEVC tiles) and the ROI position information (comprising the ROI coordinates of the ROI stream), a client device may request a HEVC tile stream or multiple HEVC HEVC tile streams that may be used by the client device in order construct a subregion that comprises the first sub-region (the ROI). In particular, spatially adjoining HEVC tiles may be used by the decoder to construct a sub-region that preferably comprises the ROI of the ROI stream.

For example, as shown in FIG. 2, at a first time instance, the ROI coordinates define a first ROI 206 that overlaps with four HEVC tiles (in this case HEVC tiles at positions (1,0), (1,1), (2,0) and (2,1)). These four HEVC-tiles may form a second sub-region within the image region of the HEVC-tiled panorama stream that comprises the ROI at the first time instance. Similarly, at the second time instance, the ROI coordinates may define a second ROI 210 that overlaps with two HEVC tiles (in this case HEVC tiles at positions (0,2) and (1,2)). These two HEVC tiles may form a second sub-region within the HEVC-tiled panorama stream that comprises the ROI at the second time instance. This scheme may be used to smoothly switch from the ROI stream to tiled streaming.

As will be described hereunder in more detail, a user may interact with a displayed image region using a user interface (e.g. a touch screen or a pointing device) and manipulate the displayed content (e.g. on the basis of panning, zooming, tilting manipulations). In response to this user interaction, the interface may generate an instruction for the client device to start rendering the user-requested ROI on the basis of a HEVC-tiled stream. Hence, a user may move and/or expand the ROI and—in response—an appropriate tile representation, a HEVC-tiled stream within that tile representation and one or more HEVC tiles of the HEVC-tiled stream may be selected in order to form a region of adjacent HEVC tiles in which the ROI is located. If the video data associated with the tiles is already present at the client device, the tiles need not be streamed as HEVC tile streams to the client device before the video data can be used for rendering the ROI. If these data are not present, they are first streamed as one or more HEVC tile streams, before the ROI is being rendered. This mode of rendering a user-selected ROI may be referred to as the tiled streaming mode.

Hence, from the above it follows that: 1) a user may watch a certain scene in a first mode (the (non-tiled) ROI streaming mode) on the basis of a ROI stream (as described with reference to FIG. 1) wherein the ROI stream may be delivered to the client device as e.g. an MPEG stream; and, 2) a user may watch the same scene, details of the scene or the regions around the scene in a second mode (the tiled streaming mode) on the basis of a HEVC-tiled stream (as described with reference to FIG. 2). As shown in FIGS. 1 and 2, the transition from the ROI streaming mode to the tiled streaming mode (and back) is realized on the basis of ROI position information, i.e. ROI coordinates associated with the ROI stream.

The ROI stream may be used by the client in a default streaming mode, the (non-tiled) ROI streaming mode, wherein a broadcast, multicast or unicast ROI stream is rendered by the client device. The HEVC-tiled stream may be used by the client to render a ROI that may be manipulated by the user using a user interface (UI) of the client device. When a client is rendering a ROI stream in the ROI streaming mode, the client will know the position of the ROI within the full image region of the source video on the basis of the ROI position information. The ROI position information associated with the ROI stream may be used by the client to smoothly or even seamlessly switch to the tiled streaming mode.

Figure 4:
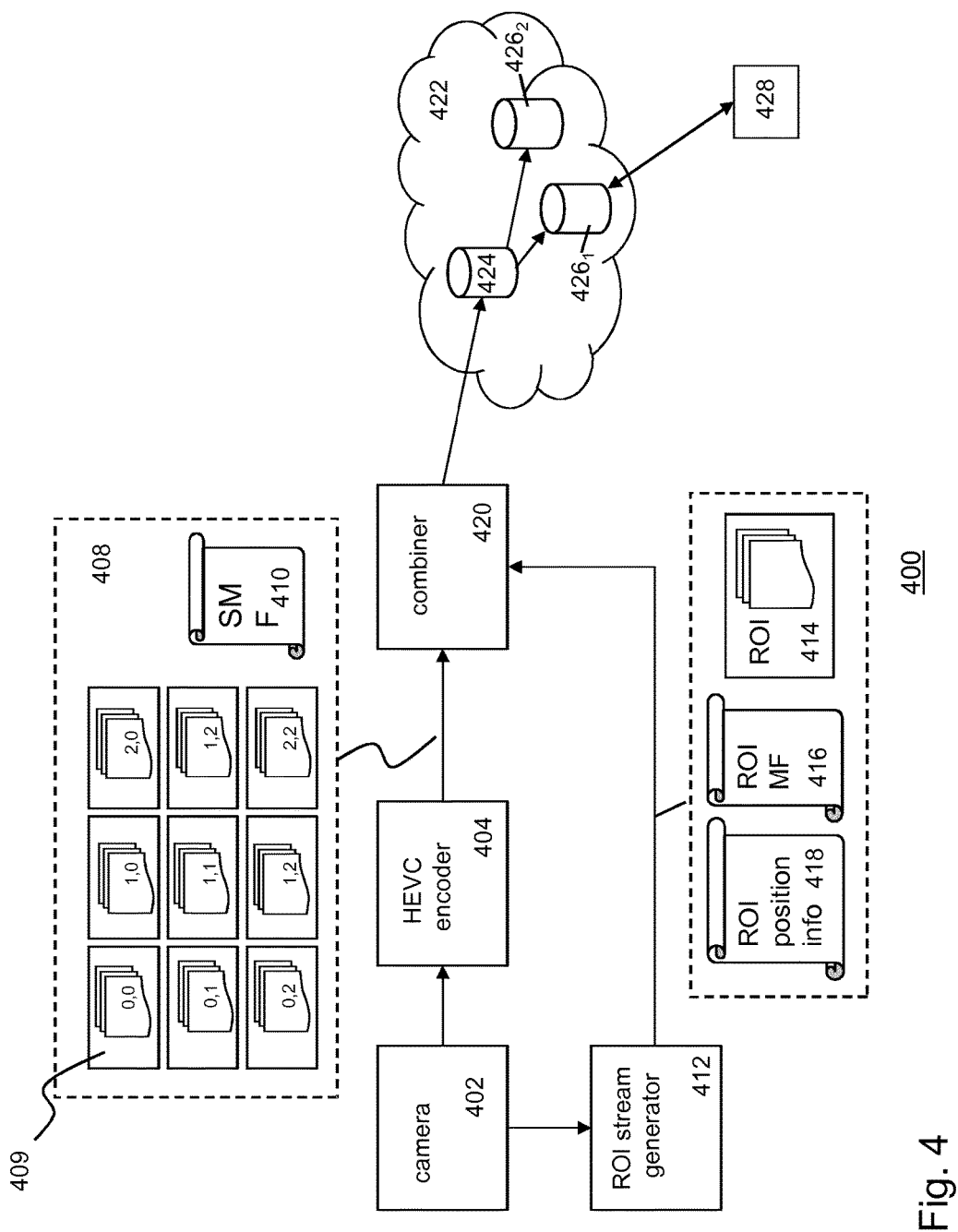
FIG. 4 schematically depicts a process for generating a ROI stream and associated tiled content according to an embodiment of the invention.

FIG. 4 schematically depicts a process for generating a ROI stream and associated HEVC-tiled streams according to an embodiment of the invention. In this example, one or more cameras 402, e.g. one or more high-resolution, wide field-of-view cameras may be used to generate or compose a source video, typically a panorama video. An HEVC encoder 404 may be used to generate one or more HEVC-tiled streams 408 on the basis of the source video. The HEVC-tiled streams may define different tile representations 409 of the source video wherein information on the HEVC-tiled streams, the HEVC tiles in each of the HEVC-tiled streams and, in some embodiments, the temporal relation of segments in the HEVC-tiled streams may be defined in a SMF 410.

The source video may be further delivered to a ROI stream generator 412. The ROI stream generator is configured to select a ROI (e.g. a region with a particular activity) by panning and zooming through the image region of the frames of the source frames and generate a ROI stream by cropping the ROI out of video frames and building a new video stream (a ROI stream 414) on the basis of cropped image regions. The ROI may be selected automatically using an algorithm, e.g. a tracking algorithm for tracking a particular object in the images, or a human operator that selects the ROI. During the generation of the ROI stream, the coordinates of the ROI may be collected as ROI position information 418. The ROI position information may be sent as metadata in the ROI stream or as separate data file to the client. If the ROI position information is sent in a separate stream, the ROI position information may comprise information (e.g. frame numbers) for linking ROI position information, e.g. ROI coordinates, to frames in the ROI stream. In a further embodiment, the ROI stream may be configured as a temporally segmented stream for adaptive streaming. In that case, the segments of the ROI stream may be defined in a ROI manifest file 416.

In an embodiment, the ROI stream is not formed (e.g. by cropping) on the basis of a source file, but rather is the direct output of a separate broadcast camera, i.e. a broadcast stream, that captures part of the same scene as contained in the source video as described with reference to FIG. 1.

A combiner 420 may combine the ROI stream with the one or more HEVC-tiled streams 408 before it is sent to a delivery network 422. Combining the ROI stream with the HEVC-tiled stream may include forming a SMF that both comprises information on the HEVC-tiled streams and the ROI stream. In an embodiment, the combiner may insert a ROI stream identifier (e.g. at least part of an URL or URI) and, in some embodiments, a manifest file associated with temporal segments of the ROI stream in the SMF.

The one or more HEVC-tiled streams (optionally as collections of independent HEVC tile streams) and ROI streams may be stored at one or more delivery nodes $426_{1,2}$ in the network wherein a delivery node is configured to deliver at least part (e.g. one or more HEVC tile streams) of the one or more HEVC-tiled streams and/or ROI streams to a client 428 in a (mobile) client device.

In an embodiment, a delivery node may be a media server. In another embodiment, at least part of the delivery nodes (sometimes also referred to as surrogate nodes) may be part of a dedicated content delivery network (CDN). In that case, HEVC-tiled streams and ROI streams may be ingested by a Content Delivery Network Control Function 424 (CDNCF). The CDNCF then distributes the HEVC-tiled streams and ROI streams over different delivery nodes so that efficient distribution of the streams is ensured. In an embodiment, the CDN may update the tile (and segment) identifiers (the URLs) such that a client may efficiently access delivery nodes of the CDN in order to request the delivery of (tiled) content.

When a client 428 of a client device would like to access the ROI and/or HEVC-tiled streams, it may receive a SMF from a content provider or the CDN and use the SMF to request and playout a ROI stream and/or one or more associated HEVC tiles of a HEVC-tiled stream. The client device may generally relate to a (mobile) content play-out device such as an electronic tablet, a smart-phone, a notebook, a media player, a home gateway or DASH enabled devices such as a DASH-enabled HbbTV display device. Alternatively, the client device may be a set-top box or content storage device configured for processing and temporarily storing content for future consumption by a content play-out device, which has access to the stored content.

Figure 5:
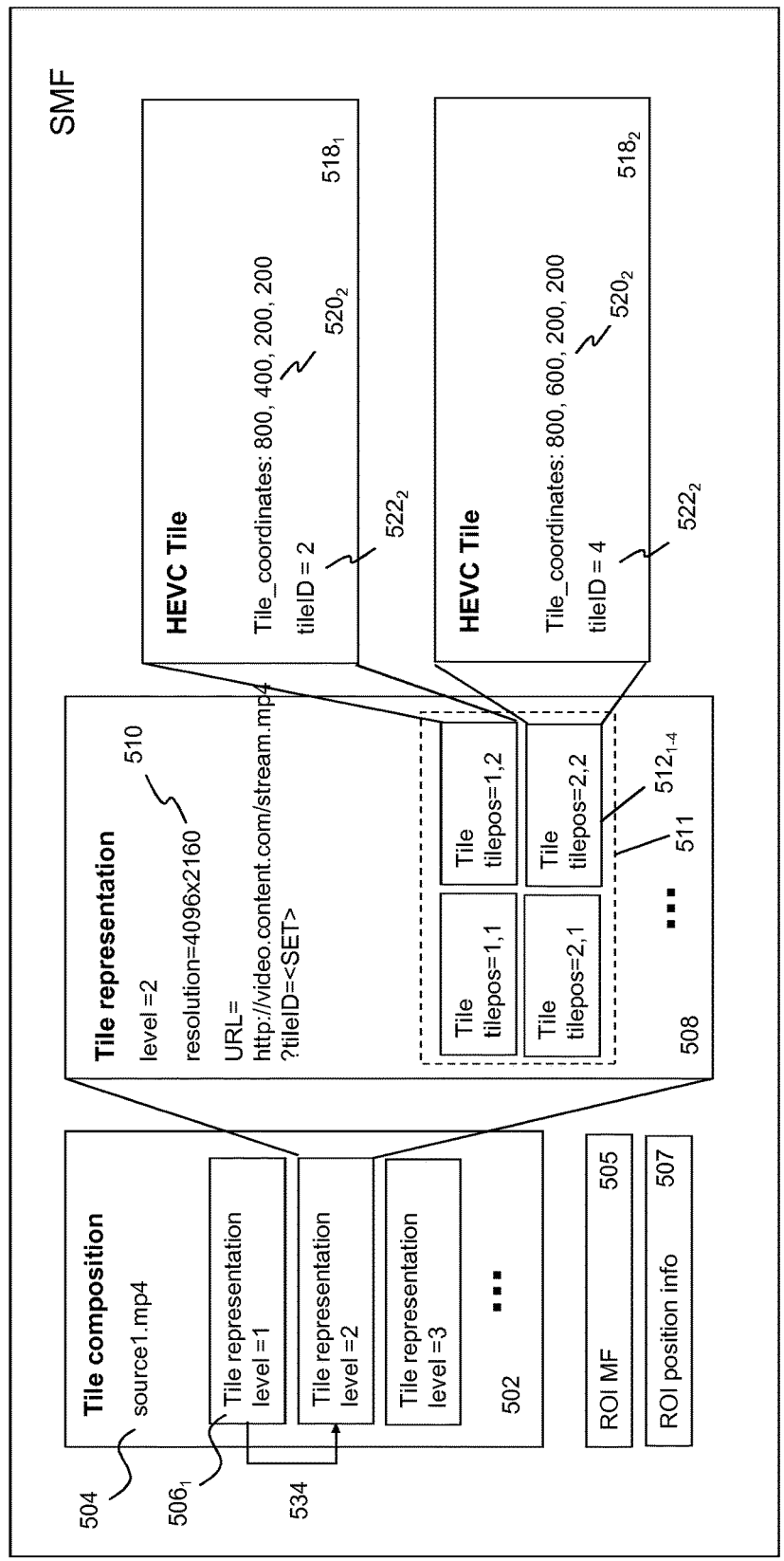
FIG. 5 schematically depicts a data structure for managing a ROI streaming process according to one embodiment of the invention.

FIG. 5 schematically depicts a data structure 500 for managing a ROI streaming process according to one embodiment of the invention. In particular, FIG. 5 depicts a spatial manifest file (SMF), which may comprise several hierarchical data levels 502,508,$518_{1,2}$. A first data level 502 may relate to tile composition information defining one or more tile representations $506_{1-3}$ of a source video (e.g. source1.mp4). Typically, the source video may be formed on the basis of one or more high-resolution and, often, wide field-of-view HD or even UHD video streams or files.

The next data level 508 may define tile representations $506_{1-3}$. A tile representation 508 may define a set of HEVC tiles 511 of a certain quality. A HEVC tile instance $512_{1-4}$ may define a HEVC tile. In an embodiment, the set of HEVC tiles may be defined as HEVC tile tracks in a HEVC-tiled stream. In an embodiment of the invention, the set of HEVC tiles may be defined as a set of individually storable and accessible HEVC HEVC tile streams.

The tile position information may define the position of the HEVC tiles in HEVC-tiled stream of a certain tile representation. For example, two HEVC tiles (tile positions (1,1) and (1,2)) that comprise content associated with the top half of the image region in the source video (the associated HEVC-tiled video).

The tile representation may further comprise information about a source resolution 510 indicating the resolution version of the source video, which is used to generate the HEVC tiles referred to in the spatial map. For example, in FIG. 5 the HEVC tiles referred to in the spatial map may be generated on the basis of a 4096×2160 resolution version of the source video.

In an embodiment, data associated with one HEVC tile may be structured as tile information $518_{1,2}$, i.e. information on the individual HEVC tiles. Tile information may comprise position information $520_{1,2}$, e.g. tile coordinates, of a HEVC tile. The tile coordinates may be based on an absolute or a relative coordinate system and used by the HEVC decoder to spatially position the HEVC tiles into a seamless video image for display.

The tile information may further include one or more tile identifiers $522_{1,2}$ (e.g. part of an URI or URL). In one embodiment, the tile information may be used for locating one or more delivery nodes, which are configured to transmit the video data of the HEVC tile in a HEVC tile stream to the client device, and/or for locating one or more specific files, preferably streamable files on one of these delivery nodes.

In an embodiment, the SMF may further comprise a data structure 505 (e.g. a manifest file or a reference to a manifest file) of one or more ROI streams, wherein said ROI stream may be generated on the basis of the same source video as the HEVC tiles. In an embodiment, the ROI stream may comprise ROI position information. In another embodiment, the SMF may comprise a reference (e.g. an URL) to a file or a stream comprising position information of the ROI 507.

Figure 6:
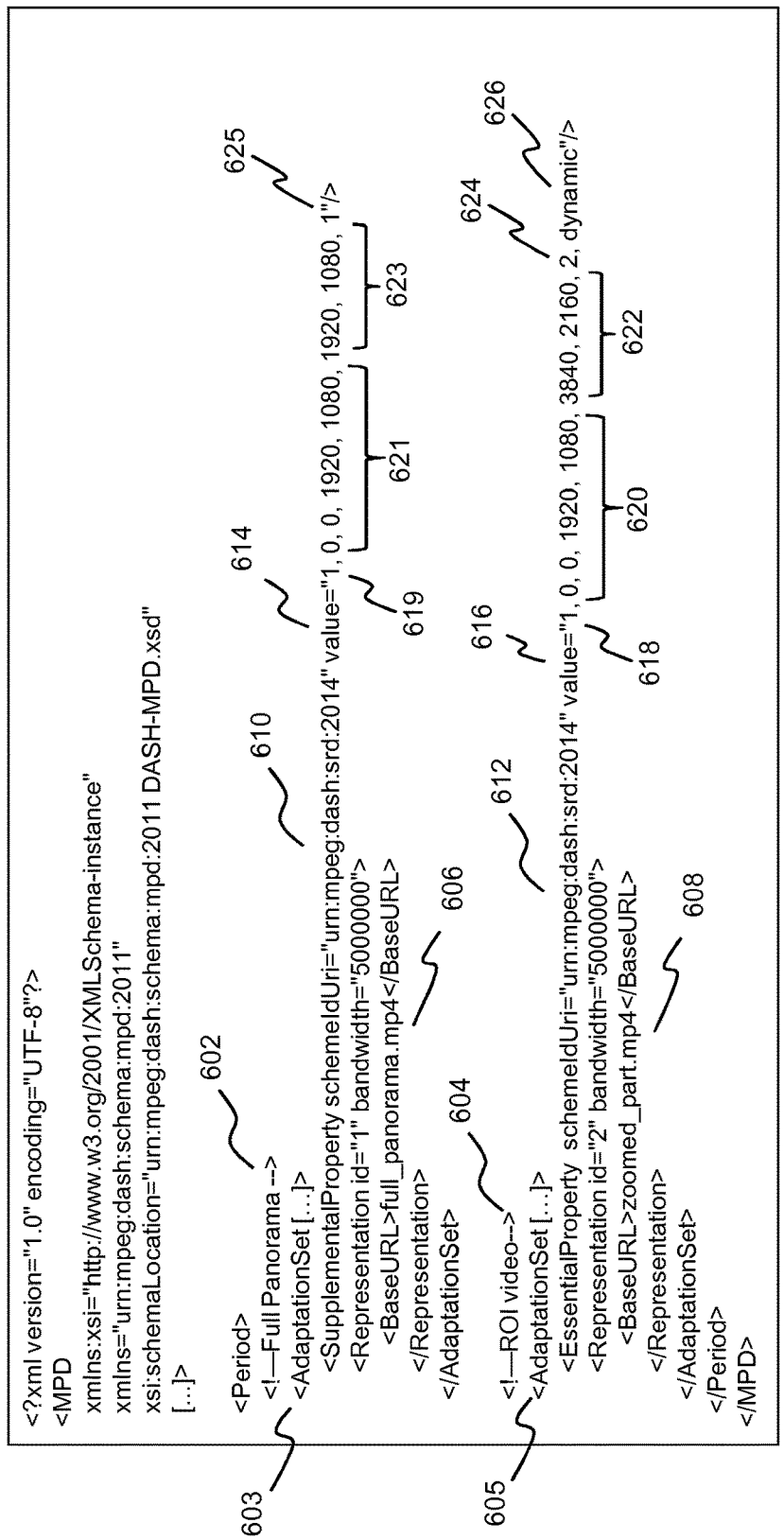
FIG. 6 depicts a spatial manifest file for managing a ROI streaming process according to an embodiment of the invention.

FIG. 6 depicts a spatial manifest file 600 for managing a ROI streaming process according to an embodiment of the invention. In particular FIG. 6 depicts an example of an MPEG-DASH MPD defining different MPD video elements, which are associated with an identifier, e.g. (part of) an URL or URI. The DASH client (residing on a client device) may use the identifier to access and retrieve the video data associated with the MPD video elements. For example, in this example, a first MPD video element 602 may be associated with at least one panorama video (a wide field-of-view video defined by the URI "full_panorama.mp4" 606). The second MPD element 604 may be associated with a ROI video (a ROI video defined by the URI "zoomed_part.mp4" 608) wherein at least part of the spatial relationship between the MPD video elements is defined on the basis of position information, which will be described hereunder in more detail.

An MPD video element may be defined as an "AdaptationSet" attribute comprising one or more representations (different versions of the same or associated content wherein the difference may be defined by one or more encoding parameters).

A DASH client may use the information in the MPD to request video data associated with a MPD video element from the network. Furthermore, a DASH client may use information (metadata) in the MPD to configure the HEVC decoder so that it may start decoding the video data of a HEVC encoded stream as soon as the video data are received. The information (metadata) for configuring the HEVC decoder may include the spatial relationship between the MPD video elements, in this case the HEVC tiled panorama video stream and a ROI stream. To that end, the MPD author may include position information in the MPD. The position information may be defined by one or more spatial relationship descriptors (SRDs) 610,612. An SRD may be used in the EssentialProperty attribute (information that is required to be understood by the client when processing a descriptor) or a SupplementalProperty attribute (information that may be discarded by a client when processing a descriptor) in order to inform the decoder, in particular the HEVC decoder, that a spatial relationship between the MPD video elements exist. In an embodiment, the spatial relationship descriptor schemeIdUri "urn:mpeg:dash:srd:2014") may be used.

In an embodiment, the position information may be defined on the basis of the @value attribute 614,616 which may comprise a plurality of parameters including but not limited to:

The source_id parameter 618,619 may define the set of MPD elements (AdaptationSet or SubRepresentation) that have a spatial relationship with each other.

The position parameters 620,621 x, y, w, h may define the position of a MPD video element wherein the coordinates x, y define the origin of the image region of the MPD video element and w and h define the width and height of the image region. The position parameters may be expressed in a given arbitrary unit, e.g. pixel units.

The tuple W and H 622,623 define the dimension of the reference space expressed in an arbitrary unit which is the same as the x, y, w and h.

The spatial_set_id 624,625 allows grouping of MPD elements in a coherent group. Such group of MPD elements may be e.g. used as a resolution layer indicator.

The dynamic parameter 626 may be used to signal that the position of the spatial representation descriptor 612 varies over time. In that case, the values x and y are set to 0, meaning that the MPD does not provide them but they are signalled outside the MPD. Implicitly the positions of the Representation are to be found in the video container.

Hence, the manifest file as depicted in FIG. 6 may define one or more HEVC-tiled streams (e.g. a HEVC-tiled panorama stream) and one or more dynamic ROI streams that have a spatial relationship between each other. The source parameter "1" in the position information of the different MPD video elements indicates that the different MPD video elements are spatially related to each other.

The initial spatial relationship between the streams may be defined on the basis of position parameters of the HEVC-tiled stream and the ROI stream. Thereafter, the spatial relationship between the streams may change continuously in time as the ROI stream in the MPD is defined as a "dynamic" ROI stream (as indicated by the dynamic parameter). The movement of the ROI may be provided to the client by the ROI position information. The ROI position information may comprise ROI position data (ROI coordinates), which may be transmitted with the ROI stream to the client device.

Hence, the position information associated with the MPD video elements may be used by the DASH client to inform the HEVC decoder about the spatial relation of the streams before the video data are actually received by the client. This way, the HEVC decoder may be initialized and start decoding the video data as soon as the data are received.

Figure 7:
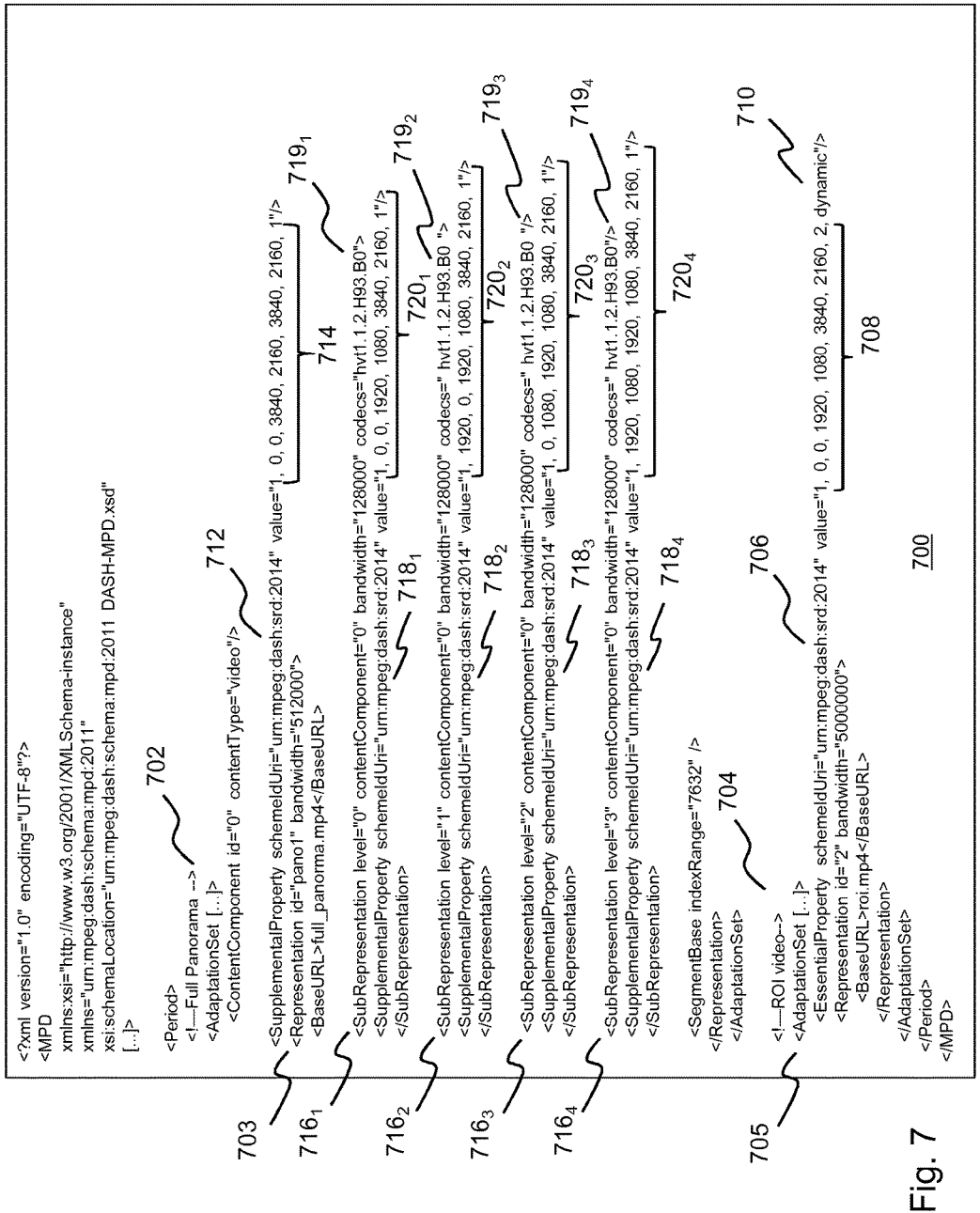
FIG. 7 depicts a spatial manifest file for managing a ROI streaming process according to an embodiment of the invention.

FIG. 7 depicts a spatial manifest file 700 for managing a ROI streaming process according to another embodiment of the invention. In particular, FIG. 7 depicts an example of an MPEG-DASH MPD defining different MPD video elements, including at least one first MPD video element 702 associated with at least one HECV-tiled video stream (in this particular example a wide field-of-view video identified by the URL "full_panorama.mp4") and at least one second MPD element 704 associated with a ROI video stream (in this particular example a ROI video defined by the URL "roi.mp4") wherein the spatial relationship the different HEVC tiles in the HEVC-tiled video stream and the ROI stream is defined on the basis of position information (e.g. in the form of one or more SRDs).

The first MPD video element may be defined as an AdaptationSet, comprising a Representation 703 and one or more SubRepresentations $716_{1-4}$ (i.e. parts composing this Representation which can be linked to the concept of tracks at the container level as described with reference to FIG. 3). This may be for example case when content (audio and video) is muxed in the same file container in separate track. In an embodiment, the first MPD video element may define a HEVC-tiled video stream wherein the Representation 703 defines a tiled wide field-of-view panorama stream (in this case comprising by four HEVC tiles). The SubRepresentations $716_{1-4}$ define the individual HEVC tiles wherein each HEVC tile may be stored as a separate track in the MPEG stream as shown in FIG. 3 above. The video data in a track may be encoded such that independent playout of the (temporal segments of) a HEVC tile by the decoder is possible.

The encoder attribute "codecs" $719_{1-4}$ refers to an "hvt1" type codec (the t in hvt1 refers to tile) indicating that the video data belong to an HEVC tile. Further, each HEVC tile in the SubRepresenation may be associated with an SRD $718_{1-4}$ comprising one or more position parameters $720_{1-4}$ for defining the position of the HEVC tile.

The second MPD video element may define an ROI video stream SRD 706 in the EssentialProperty attribute of the ROI video with one or more position parameters 708 for defining the position of the ROI stream.

In an embodiment, the SRD scheme may be defined by schemeIdUri "urn:mpeg:dash:srd:2014" wherein the spatial relationship may be defined on the basis of the @value attribute values 708,710,714,$720_{1-4}$. As the ROI coordinates of the ROI stream change in time, the SRD of the ROI video may comprise the "dynamic" parameter 710 as described in detail with reference to FIG. 6.

The SRDs 712,706,718$_{1-4}$ of the first and second MPD video elements may be used for informing the HEVC decoder about the spatial relationship of the different streams.

In the example of FIG. 7 the HEVC-tiled stream may be sent as one stream to a client device. Selection of the HEVC tiles for playout may be realized at the decoding stage.

In an embodiment, the track video data may be stored sequentially thereby allowing the DASH client to retrieve part of the SubSegments corresponding to one SubRepresentation. Such HTTP requests would make use of byte range signalling where the byte ranges for each SubRepresentation are provided in the so-called "ssix" box according to ISO/IEC 14496 part 12.

In case the temporal segments extracted from a track are not self-sufficient, an Initialization Segment URL may be provided as attribute of the Representation to overcome this problem. A so-called initialization segment may be defined comprising metadata that are necessary to render the video data in the segments of a HEVC tile. In an initialization segment the tile structure and/or the positions of a HEVC tile may be provided.

Figure 8A:
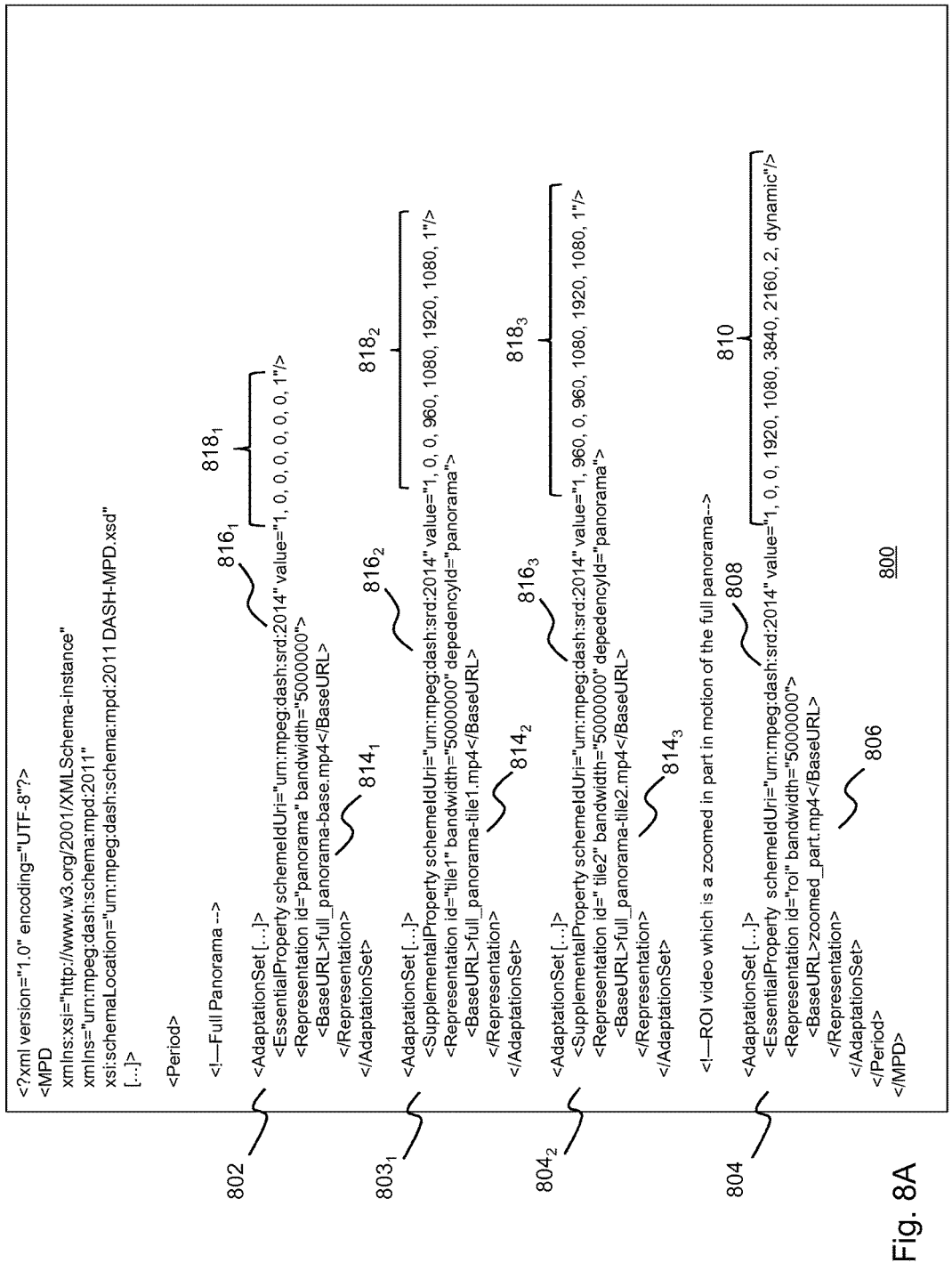

FIG. 8A depicts a spatial manifest file 800 for managing a ROI streaming process according to another embodiment of the invention. In particular, FIG. 8A depicts an example of an MPEG-DASH MPD defining different MPD video elements 802,803$_{1,2}$,804. A first MPD video element 802 associated with a HEVC-tiled panorama video defined by the URI "full_panorama-base.mp4" 814$_1$. Here, the HEVC-tiled panorama video is defined as a base track comprising "extractors" that refer one or more individually addressable tile tracks (in a similar way as described with reference to FIG. 3) that are defined by MPD video elements 803$_{1,2}$.

MPD video element 803$_1$ may define a first tile track comprising video data of a first HECV tile identified by a first tile identifier 814$_2$ ("full_panorama-tile1.mp4") and a MPD video element 803$_2$ may define a second tile track comprising video data of a second HEVC tile identified by a second tile identifier 814$_3$ ("full_panorama-tile2.mp4"). The last MPD video element 804 may define a ROI video stream (in this particular example a ROI video defined by a ROI stream identifier "zoomed_part.mp4" 806).

Position information, comprising the SRD 808 in the EssentialProperty attribute of the ROI video and SRDs 816$_{1-3}$ in the SupplementalProperty attributes of MPD video elements may be used for informing the HEVC decoder about the spatial relationship between the MPD video elements. In an embodiment, the spatial relationship descriptor schemeIdUri "urn:mpeg:dash:srd:2014" may be used for defining the position information wherein the spatial relationship may be defined on the basis of the @value attribute values 810,818$_{1-3}$ and a "dynamic" parameter as described in detail with reference to FIG. 6.

In this particular embodiment, the HEVC tiles are formatted as independently storable and addressable HEVC tile streams. The Representation 802 that is identified by @id "panorama" represents the base track as explained above with reference to FIG. 3 and may be used in combination with the HEVC tiles defined by the Representations 803$_{1-}$, identified by @id, "tile1" and "tile2".

Hence, the client may use the SMF in order to request either the HEVC-tiled panorama video stream (using the information in the base track) and the HEVC tile streams from a delivery node. Then, when receiving the requested tracks, the decoder may parse the base track and replace extractors in the base track with audio and/or video data of a tile track it refers to. Alternatively, in another embodiment, the client may use the SMF in order to individually request the separate HEVC tile tracks and the HEVC decoder may decode the tile tracks for rendering.

FIG. 8B depicts a spatial manifest file 800 for managing a ROI streaming process according to another embodiment of the invention. In particular, FIG. 8A depicts an example of an MPEG-DASH MPD defining a HEVC-tiled panorama video comprising two HEVC tiles in a similar way as described with reference to FIG. 8A. In this embodiment, however the ROI stream 822 is defined differently in the sense that it is described as a Representation comprising a first SubRepresentation 824$_1$ associated with ROI video data and a second SubRepresentation 824$_2$ associated with ROI coordinates.

Hence, in this particular embodiment, the ROI video data and the ROI coordinates are stored in separate tracks, i.e. a video track comprising HEVC encoded video data (as denoted by the codec attribute "hvc1" 826) and a metadata track comprising coordinates (as denoted by the codec attribute "coor" 828).

Hence, from the above it follows that the client not only uses the information in the SMF to locate delivery nodes in the network node that can deliver the desired video data to the client, but also uses metadata of the HEVC-tiled streams and the ROI streams defined in SMF in order to configure the decoder before the HEVC-tiled video data and/or the ROI (video) data are received by the client. This metadata may include for example:

- information for determining that the selected spatial segment is related to HEVC-tiled video data (e.g. a codec attribute "hvt1");
- information for signaling that the video data of a HEVC tile are stored in separate tracks (using the SubRepresenation for defining a HEVC tile);
- information for determining the number and/or size of HEVC-tiles (e.g. the number of HEVC-tiles that are represented as a SubRepresentation and/or part of the position information associated with the SRDs);
- information for determining the position of the position of the HEVC tiles or the ROI stream (e.g. part of the position information associated with the SRDs);
- information for signaling that the ROI position and/or the size of the ROI changes in time (using e.g. the "dynamic" parameter);
- information for signaling that the ROI position information is stored in a track that is separate from the ROI video data (using e.g. a SubRepresentation for defining a metadata track).

Figure 9:
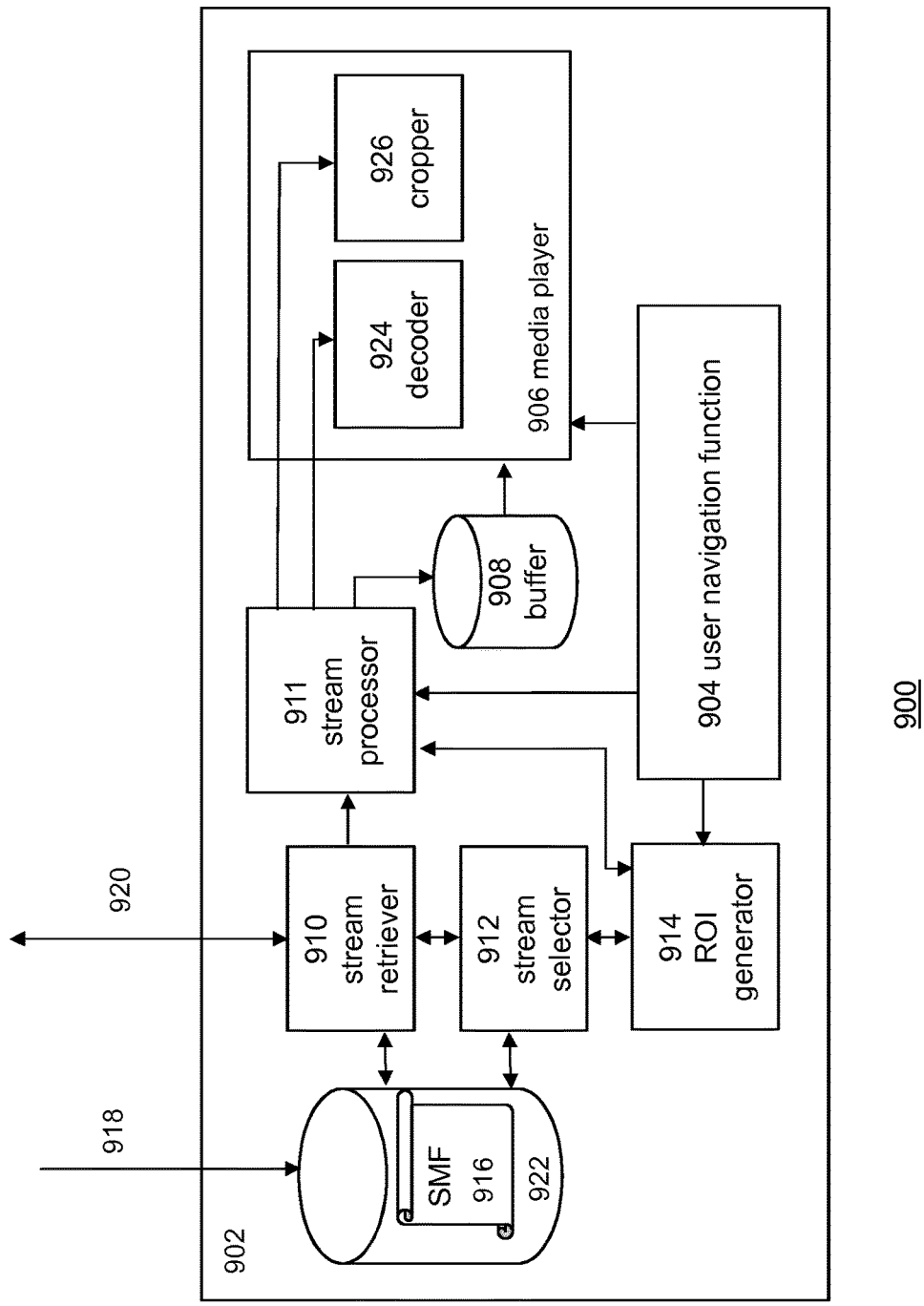
FIG. 9 depicts a client device configured for rendering a ROI stream on the basis of a spatial manifest file according to an embodiment of the invention.

FIG. 9 depicts a client device according to one embodiment of the invention. In particular, FIG. 9 depicts a client device comprising a user navigation function 904 for interpreting user interaction with the (tiled) content that is processed by a media player 906 which may comprise an HEVC decoder 922 and a cropper 924. The user navigation function may be connected to a user interface that may include a touch-screen, a camera, keyboard, mouse, trackerball, joystick, microphone, head tracking sensor, eye and gaze tracking, buttons or any other man-machine interface that allows manipulation (e.g. panning, zooming and/or tilting) of the displayed content.

The client device may further comprise a manifest cache 922 for receiving one or more spatial manifest files (SMFs) from a content provider or a content source in the network (e.g. a media server or a CDN). As described in detail with reference to FIG. 5-8, the SMF 916 may define (part of) tile identifiers (URLs) of one or more HEVC-tiled streams.

Further, the SMF may comprise the tile position information comprising the position of the HEVC tiles.

In some embodiments, the SMF may further comprise a data structure defining a ROI stream that may be formatted on the basis of HTTP adaptive streaming protocol. Alternatively, the data structure defining the ROI stream may be stored as a separate manifest file in the manifest cache.

In an embodiment, the ROI stream may be a unicast stream. In another embodiment, the ROI stream may be a multicast or broadcast stream in which the ROI coordinates are embedded. In that case, the client device may be configured request (tune in or join) the broadcast stream or the multicast stream respectively.

The manifest cache may be connected to a stream retriever 910 and a stream selector 912. The stream selector may select one or more streams (a HEVC-tiled stream, one or more HEVC tile streams and/or ROI streams) and instruct the stream retriever to request the one or more selected streams from the network 920 according to a certain scheme.

In the default situation of no user interaction, the content associated with the SMF may be streamed to the client device on the basis of the ROI stream that comprises (or is associated with) ROI position information as described in detail with reference to FIGS. 1 and 2. Hence, in case the ROI stream is an HAS stream, the stream selector may instruct the stream retriever to request temporal segments of the (default) ROI stream. The segments of the ROI stream are not processed by the stream processor but are directly forwarded to the buffer 908 of the media player. Similarly, in case the ROI stream is a broadcast or multicast stream, the stream selector may join or tune into the required broadcast stream and the stream receiver may forward the packets directly to the buffer 908.

When the user navigation function is triggered by user interaction, the user navigation function may instruct the stream processor to extract the ROI position information from the ROI stream and forward the information to the ROI generator. The ROI generator may start generating ROI coordinates wherein the first coordinates may correspond to the ROI coordinates of one or more frames of the ROI stream that were processed by the client device at the time instance that user interaction was detected.

In another embodiment, the stream processor may always extract the ROI position information from the ROI stream and provide this information to the ROI generator. In that case, during the streaming and rendering of the ROI stream, the ROI coordinates of the rendered frames are always available to the client device. In some embodiments, the ROI position information may be extracted from the ROI stream without decoding the frames. In other embodiments, the ROI position information may be extracted from the ROI stream after decoding the frames. In that case, the stream processor may be part of the media player that comprises a decoder for decoding the encoded frames.

The ROI generator may start calculating ROI coordinates on the basis of the user navigation output and the ROI coordinates of the ROI stream. In an embodiment, the user navigation function may interpret the user-interaction and generate a ROI vector that allows the ROI generator to calculate new ROI coordinates that correlate with a particular user interaction. For example, the user navigation function may interpret a one-finger sliding gesture into panning (translation) of the ROI and generate a translation vector for that ROI generator. In a similar way, a two-finger pinch gesture may be interpreted as a zooming action of the ROI, a button-hold as a freezing the ROI, and a spoken user command "full screen" as a zooming to full screen. The ROI generator keeps on calculating ROI coordinates when user input is received.

When the stream selector receives the calculated ROI coordinates from the ROI generator, it may use the tile position information in the SMF and the calculated ROI coordinates originating from the ROI generator in order to select a set of adjacent HEVC tiles that may be used for forming a sub-region within the full image region, and wherein the video data of each of the HEVC tiles are independently storable and decodable. The video data associated with these HEVC tiles may then be requested on the basis of the SMF as describe above with reference to FIGS. 1-9 and streamed as a set of separate HEVC tile streams to the client device. After reception of the HEVC tile streams, the stream processor may synchronize and mux the video data of the different HEVC tile streams before sending the video data to the HEVC decoder 924 for generating decoded image data of an image region that comprises the ROI. The image region may be cropped by a cropper 926 on the basis of the ROI coordinates. Thus the eventual ROI may be smaller than the image region that results from the decoding process. The cropped images (each comprising the ROI) may be buffered and rendered on a display (not shown).

Hence, from the above, it follows that a user interaction may cause the client device to switch from a (default) non-tiled ROI streaming mode wherein a predetermined ROI is displayed, to a tiled streaming mode wherein the ROI displayed to the user may be manipulated by via user interaction. The term "predetermined" relates to the fact that the spatial positioning of this ROI within an image region, over a period of time, is predetermined and outside of the control of the client device. In an embodiment, when switching from the ROI streaming mode to the tiled streaming mode, the client device determines the ROI coordinates of a ROI of such predetermined ROI stream upon switching and uses these ROI coordinates in order to form a substantially the same ROI (e.g. one with the same size and substantially the same position in the tiled streaming mode so that a smooth transition during rendering of the content is achieved.

In an embodiment, an external signal may cause the client device to switch from the non-tiled ROI streaming mode to the tiled streaming mode. For example, the ROI generator may be triggered to start calculating ROI coordinates on the basis of a signal in the ROI stream or another external signal.

When switching from the ROI streaming mode to the tile streaming mode, frames in the ROI stream and frames of selected HEVC tile streams are received by the client and may be synchronized on the basis of a common content playout timeline so that a smooth or even seamless transition between both modes is enabled.

Figures 10A, 10B:
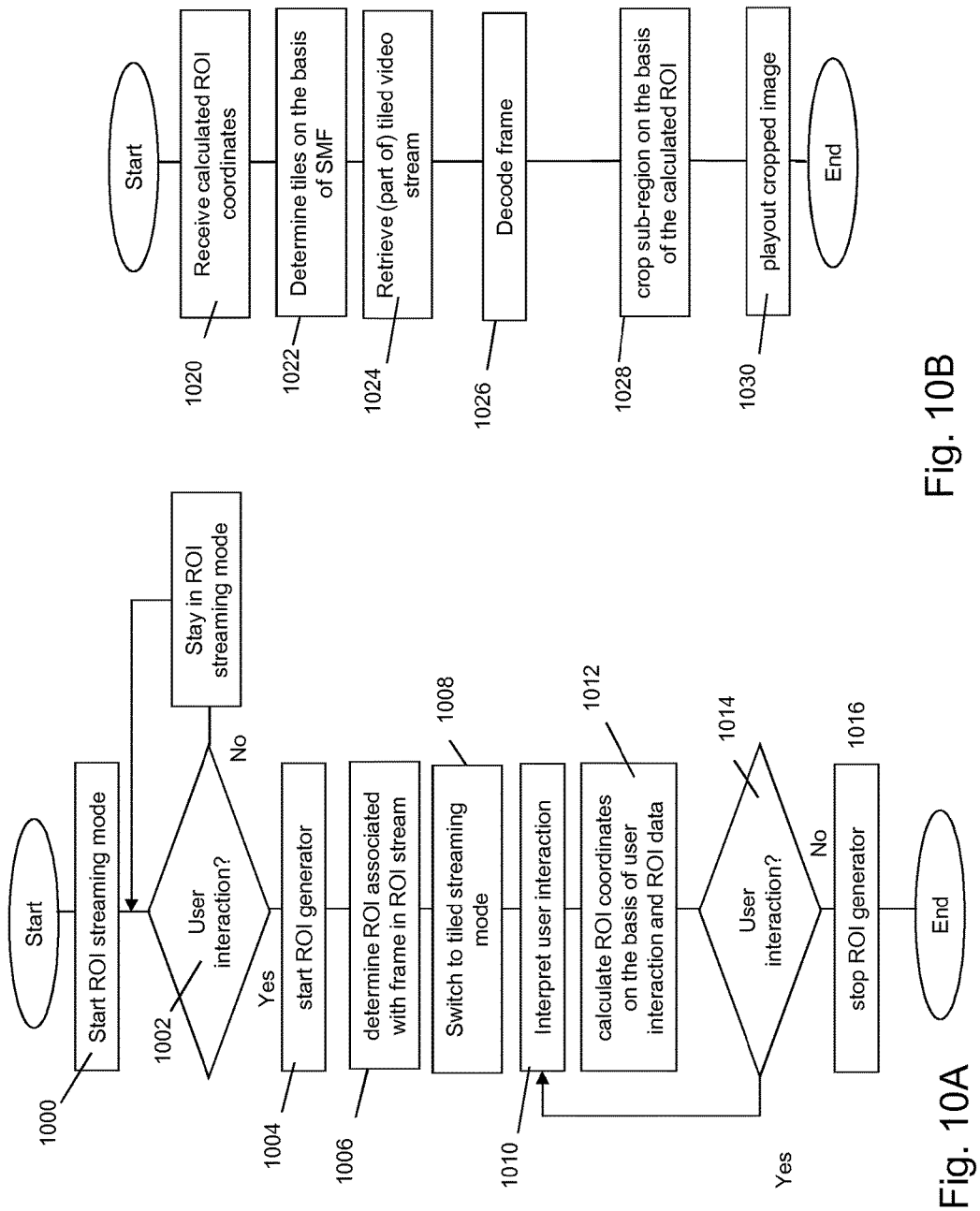
FIGS. 10A and 10B depict schematics of a process rendering a ROI stream according to an embodiment of the invention.

FIGS. 10A and 10B depict a schematic of a client process according to an embodiment of the invention. In particular, FIG. 10A depicts a client process for controlling the generation of ROIs on the basis of information originating from the user navigation function. The process may start in the (default) ROI streaming mode (step 1000). As long as no user interaction is detected, the client device (also referred to as "the client") may continue the rendering of the ROI on the basis of the ROI stream (the ROI streaming mode). If user-interaction is detected by the client (step 1002), the ROI generator may be started (step 1004) to calculate ROI coordinates for the stream selector and the stream processor (step 1006). The first ROI coordinate determined by the ROI generator may correspond to the ROI coordinates of the one or more rendered frames in the ROI stream with which the user started interacting. These ROI coordinates may be forwarded to the stream selector (step 1006) in order to switch to a tiled streaming mode (step 1008; as described in more detail with reference to FIG. 10B).

The user navigation function may interpret the particular user interaction (step 1010) and forward this information (as a ROI vector) to the ROI generator that continues receiving ROI position information associated with the ROI frames that are rendered by the client. The ROI generator may calculate the further ROI coordinates on the basis of the ROI position information of the ROI stream and the ROI vector (step 1012) and forward the calculated ROI coordinates to the stream selector and the stream processor in order to render the ROI in the tiled streaming mode. This process may continue as long as user interaction is detected (step 1014). When the ROI generator detects that there is no longer user activity (step 1014), the ROI generator may stop the generation of ROI coordinates.

In particular, FIG. 10B depicts a client process for switching from rendering a ROI in the ROI streaming mode to rendering a ROI in the tiled streaming mode. The process may start by the stream selector receiving the calculated ROI coordinates from the ROI generator (step 1020). The first ROI coordinates received by the stream selector may correspond to the ROI coordinates of the one or more rendered frames in the ROI stream with which the user started interacting. The stream selector may use the tile position information and the ROI coordinates to determine the HEVC tiles in a frame from which an image region may be formed that includes the calculated ROI (step 1022). The client may retrieve the tile position information from the SMF that is stored in the manifest cache.

Alternatively, in another embodiment, the client device (e.g. the stream processor in the client device) may obtain the tile position information directly from the (stored) HEVC-tiled video. For example as described in detail with reference to FIG. 3, the HEVC-tiled video stream (stored as a file) may comprise tile tracks wherein each tile track comprises tile position information. In that case, no SMF is required in order to determine which HEVC tiles overlap with the desired ROI.

The stream selector may instruct the stream retriever to request the video data associated with the selected HEVC tiles from the network (step 1024). When the client receives the requested HEVC tile streams, it may synchronize the streams on the basis of their common content playout timeline, mux the video data into a HEVC-tiled video stream and send the video data for decoding to the HEVC decoder (step 1026). The decoded image data representing the sub-region that comprises the ROI may be cropped on the basis of the calculated ROI coordinates (step 1028). The cropped images may be buffered and rendered on a display (step 1030). The above-described process ensures that when switching to the tiled streaming mode, the last rendered ROI in the ROI streaming mode substantially matches the first rendered ROI in the tiled streaming mode. This way, the client is able to smoothly switch from rendering ROIs in the ROI streaming mode to rendering ROIs in the tiled streaming mode.

Figure 11A:
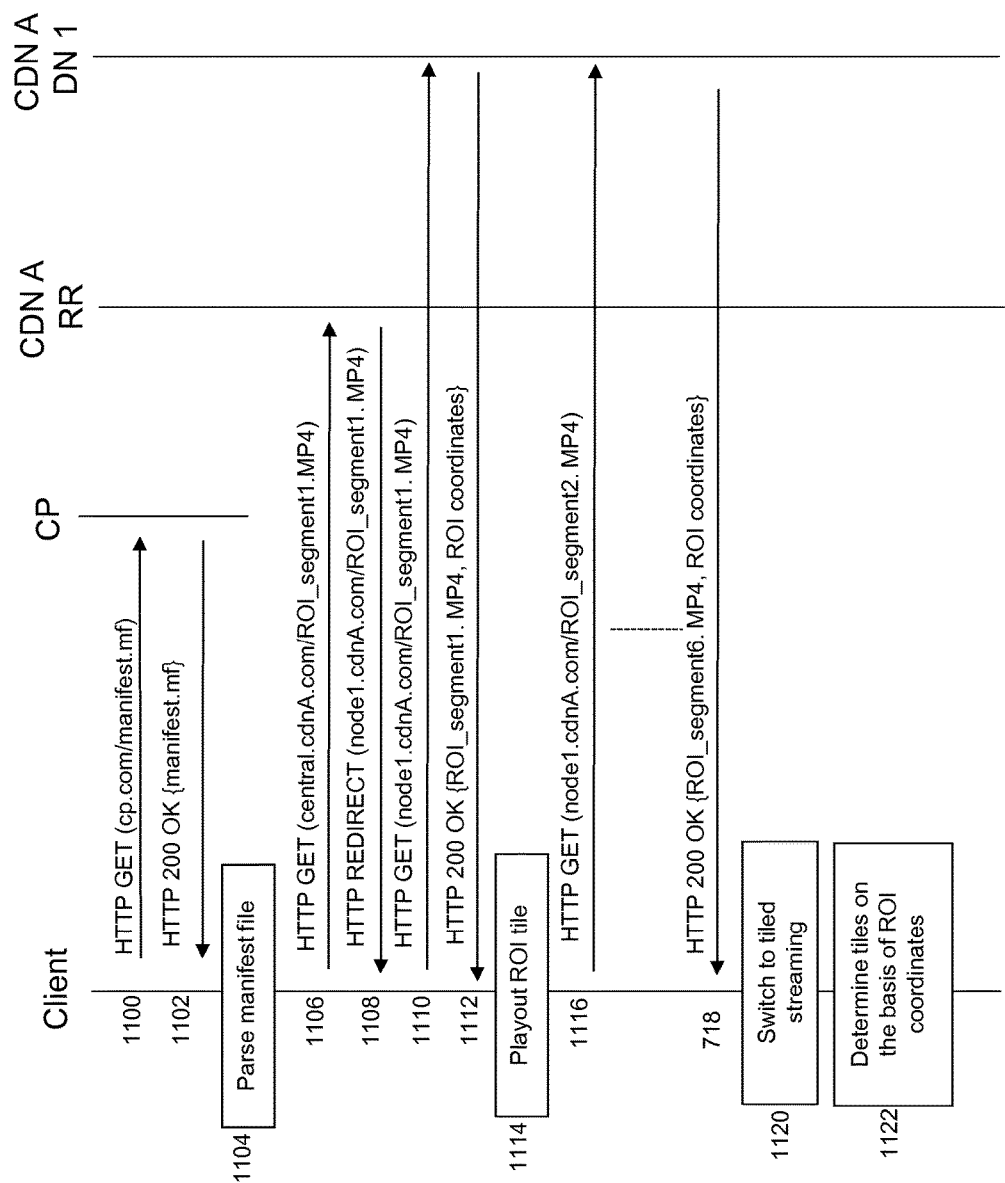
FIGS. 11A and 11B depict flow diagrams of a ROI streaming process according to an embodiment of the invention.
Figure 11B:
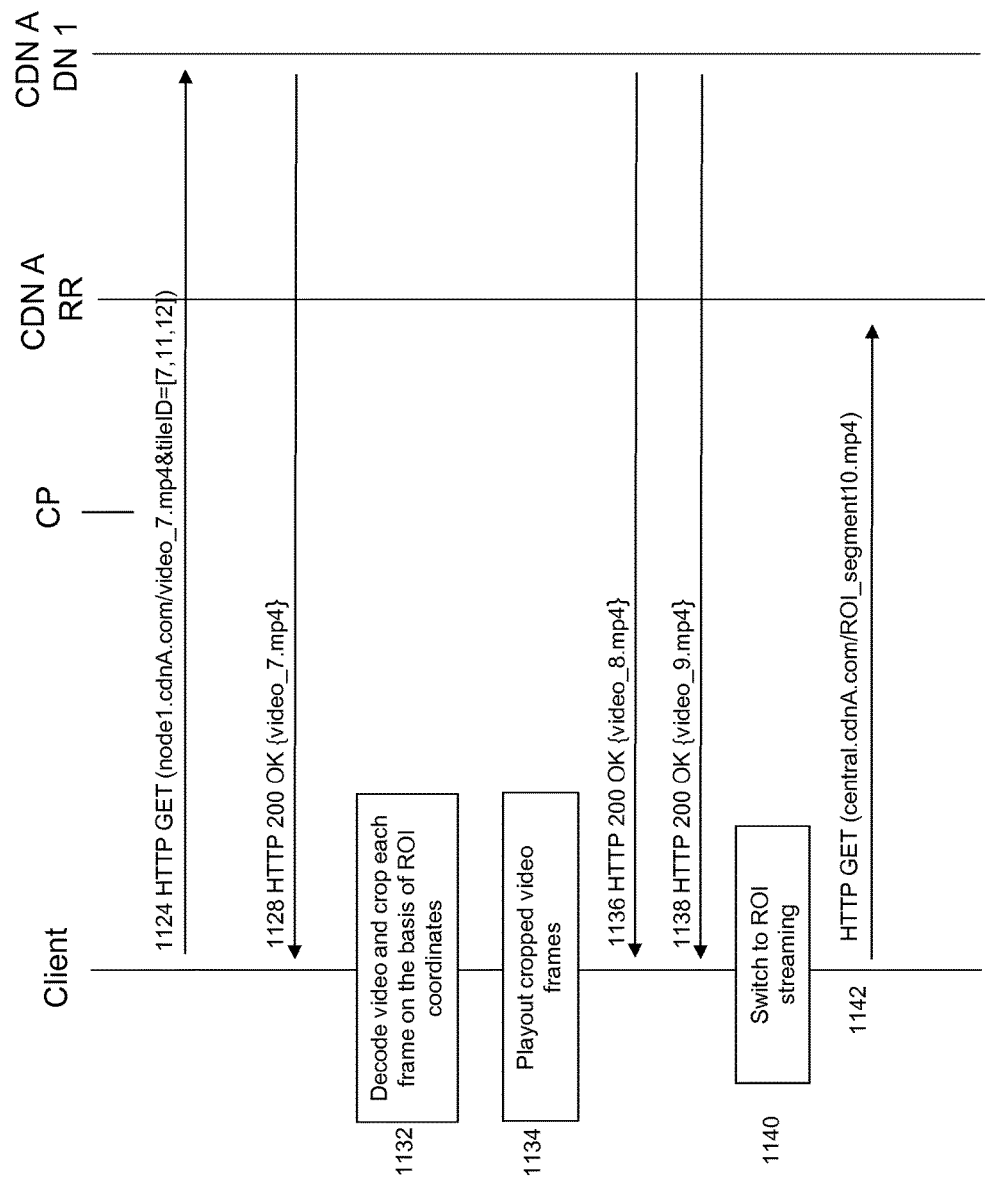

FIGS. 11A and 11B depict a ROI streaming process according to an embodiment of the invention. In this particular example, the HEVC tile streams may be distributed by a CDN to client devices (also referred to as "clients") using an adaptive streaming protocol such as an HTTP adaptive streaming protocol. The process may start with a client requesting and receiving a spatial manifest file SMF from a content provider CP (steps 1100 and 1102). The client may parse the SMF (step 1104) and start the streaming process in the ROI streaming mode. To that end, the client may select the first temporal (ROI) segment of the ROI stream on the basis of the SMF and send a request message (step 1106), e.g. an HTTP GET message, to the request routing RR node of the CDN. The request routing node may locate the delivery node on which the requested temporal ROI segments are stored and send the URL of the localized delivery node in a redirect message back to the client (step 1108). The term 'temporal' refers to the notion that a segment has a certain duration associated with a play-out period of the (content) of the segment. So a temporal segment is the result of segmentation of a source video content in the dimension of time. Any segment as referred to in this application, has a certain play-out period. On top of that, a certain category segments (those referenced in a SMF or Spatial Manifest File) may be the result of an additional spatial segmentation process wherein the video content is segmented such that a segment comprises an image area that is a subset (e.g. a portion) of the image area of a source video content. These segments are sometimes also referred to as spatial segments or tile segments as the case may be. It should be noted that a tile segment is the equivalent of a temporal segment associated with a tile/(HEVC) tile stream. A ROI segment is different in the sense that it is a temporal segment, but that it is not the result of spatial segmentation, and therefore does not need to have (but may have) 'static' position information. A tile segment in contrast is associated with tile position information that is static over time and that reflects the spatial segmentation. The client may use the URL for requesting the ROI segments identified in the SMF.

Hence, after the redirect message, the client may send a request message back to the deliver node that comprises the requested temporal ROI segment (step 1110). The delivery node may send the requested first ROI segment back to the client (step 1112). In this particular example, the ROI segment may comprise the ROI coordinates of the ROI. The ROI coordinates may define a trajectory within the spatial representation of a source video. Different ways of transporting the ROI coordinates within a stream are described hereunder in more detail. The first temporal ROI segment may be buffered and played-out by the client (step 1114) while the retrieval process for the further temporal segments may be continued.

After a certain time, e.g. during the playout of the sixth ROI segment (steps 1116-1118), the client may be triggered to switch to the tiled streaming mode (step 1120). For example, the client may detect a user interaction that is interpreted by the user navigation function as a panning action. Upon the trigger to switch to the tiled streaming mode, the client may determine first ROI coordinates associated with the one or more frames that were rendered during the detected user interaction (step 1122). Thereafter, the client may continue determining further ROI coordinates on the basis of the ROI position information of the ROI stream in a similar way as described with reference to FIGS. 9 and 10A and 10B above.

In an embodiment, the client may use the first ROI coordinates and the tile position information in the SMF in order to determine a set of spatially adjoining HEVC tiles that may be used to form an image region that comprises the ROI. In this example, a HEVC tile stream associated with a selected HEVC tile may be temporally segmented so that a HAS (HTTP adaptive streaming) protocol may be used to deliver the tile segments to the client. Thereafter, the client may start requesting these tile segments of the selected HEVC tile streams on the basis of the SMF. In particular, the client may send request messages comprising the URLs of the selected temporal segments of the HEVC tiles (in this case the seventh temporal segment of HEVC tiles 7, 11 and 12 (i.e. video7_7, video7_11 and video7_12) (steps 1124-1126), and—in response—receive response messages from the delivery node comprising the requested temporal segments of selected HEVC tile streams (steps 1128-1130).

In case the video data of the HEVC tiles are stored in separate video tracks as described in detail with reference to FIG. 3, also the base track should be requested by the client device (not shown). The base track including the extractors may be used by the HEVC decoder in order decode the video data of the selected HEVC tiles into a continuous image.

During the above-described process of determining and requesting the HEVC tile streams, the client continuous the playout of the ROI segments (not shown).

Upon reception of the requested HEVC tile streams, the client may synchronize the HEVC tile streams and the rendered ROI stream on the basis of a common content playout timeline. Synchronized frames of adjoining HEVC tile streams (i.e. frames that are associated with a particular common playout time) may be decoded by the HEVC decoder into an image region that comprises the ROI (step 1132). If needed, ROI coordinates may be used to crop the image region into an image region that is substantially similar to the ROI of the ROI stream that was played-out when the client received the requested HEVC tile streams.

When the formation of the image regions on the basis of the HEVC tile streams is in sync with the playout of the frames in the ROI stream, the client may switch from the rendering of the ROI on the basis of the ROI stream to rendering of a user-generated ROI on the basis of the HEVC tile streams (step 1134). In the tiled streaming mode the client may continue to request temporal segments of HEVC tile streams, decode frames associated with a common playout time into an image region and (optionally) crop the image region before rendering it on a display.

After a certain time, e.g. after the playout of cropped image regions that were generated on the basis of the 8 and 9 th temporal segments of the selected HEVC tile streams (steps 1136 and 1138), the user may interact with the client device in order to switch back to the default ROI streaming mode (step 1140). In this mode, the rendering of the content may be continued on the basis of the $10^{th}$ ROI segment (step 1142).

FIGS. 12A and 12B depict a process for seamless switching between a non-tiled streaming mode and a tiled streaming mode according to an embodiment of the invention. As shown in FIGS. 12A and 12B the HEVC tile streams that are being selected for starting the tiled streaming mode, are determined on the basis of ROI position information that is associated with one or more ROI frames of the ROI stream at a time T at which the client receives a trigger for switching to the tiled mode (e.g. by a user interaction).

This embodiment may be used for ROI streams or particular parts of a ROI stream where the ROI trajectory will not be outside an image region that may be formed by adjoining HEVC tile streams that are selected by the client at the time a signal for switching to the tiled streaming mode is received.

FIG. 12A depicts a situation wherein a client device (also referred to as "client") receives a signal to switch from the ROI streaming mode to the tiled streaming mode at time T. At that time, the client is rendering frame f of the ROI stream. The ROI position information associated with frame f may comprise the ROI coordinates frame f (pos0 in FIG. 12A). These ROI coordinates are used to retrieve a set of spatially adjoining (synchronized) HEVC tile streams that may be used to form an image region that comprises the ROI of frame f.

During a time period $\Delta t$ that is needed to retrieve the selected HEVC tile streams, a number of n ROI frames may be rendered by the client wherein $n=\Delta t*R$ and wherein R is the (average) frame transmission rate that is used by a delivery node to transmit the ROI stream to a client. At time T+n the client will receive the requested adjoining HEVC tile streams, synchronize the tile frames with the ROI frames of the ROI stream, decode the synchronized frames of the HEVC tile streams into an image region that comprises the ROI. If necessary, the client may use the ROI coordinate of the ROI in the ROI stream at time T+n in order to crop the image region into an image that substantially matches the ROI of the ROI of the ROI frame at T+n. Thereafter, the client may switch from the rendering of the ROI on the basis of the ROI stream to the rendering of the ROI on the basis of the cropped image so that a smooth transition to the tiled streaming mode is realized.

FIG. 12B depicts a process flow of the steps for achieving a smooth transition to the tiled streaming mode as illustrated in FIG. 12A. First, the client may receive a signal to switch to the tiled streaming mode (step 1202). Then ROI coordinates associated with frame f are provided to the client (step 1204). The client may use the ROI coordinates and the tile position information in the SMF (step 1206) in order to determine a set of adjoining HEVC tile streams that can be used to form an image region that comprises the ROI of the ROI stream at a later point in time (step 1208), i.e. at the time T+n the selected tile streams are received by the client.

The selected HEVC tile streams may be retrieved (step 1210) and are received by the client at a time T+n. Thereafter, the frames of the adjoining HEVC tile streams and the ROI frames of the rendered ROI stream may be synchronized. Tile frames f+n of spatially adjoining HEVC tile streams that have the same position on the content presentation timeline may be decoded (step 1212) by the HEVC decoder in order to form an image region comprising the ROI of frame f+n of the ROI stream (step 1214). Then, the ROI coordinates associated with ROI frame f+n may be used to crop the ROI out of the image region (step 1216). Thereafter, the displaying of the content may be switched from rendering ROI frames in the ROI stream to rendering a cropped image region provided by video data of the HEVC tile streams (step 1218). This way, a smooth transition from a ROI streaming mode to a tiled streaming.

If for any particular reason, the displayed area is not available because tiles are not yet received and/or because the ROI is (partly) outside the image region defined by the requested adjoining HEVC tile streams, a fall-back mechanism may be implemented. In an embodiment, a low-resolution video stream of the source content may be streamed to the client as a background process during the whole streaming process. When certain content is not available, the low-resolution video may be used to temporarily crop the missing content and render it while the missing HEVC tile streams are retrieved. This way a smooth transition to the tiled stream mode may be achieved even though the high-quality video may be rendered somewhat later.

FIGS. 13A and 13B depict a process for seamless switching between a ROI streaming mode and a tiled streaming mode according to another embodiment of the invention. In some situations, the time $\Delta t$ for retrieving the tile segments may be of the order of several seconds (especially when the data are delivered over a best-effort network). Furthermore in some situations, the trajectory of the ROI in the ROI stream may be very dynamic, e.g. it may comprise large translations and/or zooming actions within the image area of the source file with a short time period. Hence, during the retrieval time of the temporal segments of an HEVC tile trajectory of the ROI may have shifted outside the image region of the set of tiles that was originally selected at time T so that a smooth transition of the rendering in the ROI streaming mode to the tiled streaming mode will be hindered.

In order to deal with this problem, in certain embodiments according to the invention, the ROI position information may comprise look-ahead position information (e.g. a look-ahead position) associated with one or more video frames of the ROI video stream that are not yet received by said client, when such look-ahead position information is received. In an embodiment, the look-ahead position information may comprise one or more time-shifted first ROI coordinates of one or more image frames in said ROI video stream that are not yet received by said client device when the look-ahead position information is received. Hence these time-shifted ROI coordinates are being provided to the client device prior to the reception of the associated image frames. In a further embodiment, said time-shifted ROI coordinates may be associated with time-shift information, preferably a time stamp, for determining a time-shift. The time shift represents the period between receipt of the time-shifted ROI coordinates and the receipt of the of the video content preferably the one or more image frames, they relate to. In this embodiment, ROI position information is time-shifted so that a client device may receive ROI position information ahead of time. This way the client may request the correct HEVC tile streams even when the ROI follows a very dynamic trajectory in time within the image region of the source video (e.g. the image region of the HEVC-tiled video).

In FIGS. 13A and 13B, the ROI coordinates in the ROI position information may be provided to the client ahead of time with respect to the associated frames in the ROI stream. In an embodiment, the ROI position information may be time-shifted over a time period (expressed in a number of frames) $n=\Delta t*R$ wherein R is the (average) frame transmission rate that is used by a delivery node to transmit the ROI stream to a client. The time-shifted ROI position information may be prepared by the CDN or another entity in the network and $\Delta t$ may be the maximum time period for a CDN to deliver a segment to a client.

The time-shift $\Delta t$ may be determined on the basis of the characteristic delivery times of the network. For example, in a best effort network $\Delta t$ may be relatively large, e.g. a few seconds or more, and in a network were data is delivered according to certain QoS rules $\Delta t$ may be smaller, e.g. less than a few seconds or even less than one second.

The above-described process is schematically depicted in FIG. 13A wherein a client receivers a signal to switch from the ROI streaming mode to the tiled streaming mode at time T. At that time, the client is rendering frame f of the ROI stream. The ROI position information associated with frame f may be ROI coordinates that are shifted ahead in time. In particular, the ROI position information for frame f may comprise ROI coordinates of a future ROI frame f+n (wherein $n=\Delta t*R$). The client may determine the set of HEVC tile streams on the basis of the time-shifted ROI coordinates and the tile position information in the SMF.

After a period $\Delta t$ (n frames) the first frames of the selected HEVC tile streams will arrive at the client at time T+n. The client may synchronize the HEVC tile streams and the rendered ROI stream on the basis of a common content playout timeline. Synchronized frames of adjoining HEVC tile streams (frames of the selected HEVC tile streams that are associated with a particular common playout time) may be decoded by the HEVC decoder into an image region that comprises the ROI. The client may then form an image region that comprises the ROI use the time-shifted ROI coordinate pos f+n in order to crop an image that corresponds to the ROI of frame f+n. This way, a smooth transition to the tiled streaming mode is ensured even when the ROI is moving during the retrieval of the retrieval of the HEVC tile streams.

FIG. 13B depicts a process flow of the steps for achieving a smooth transition to the tiled streaming mode as illustrate in FIG. 13A. First, the client may receive a signal to switch to the tiled streaming mode (step 1302). Then time-shifted ROI coordinates associated with frame f+n are provided to the client (step 1304). The client may use the time-shifted ROI coordinates and the tile position information in the SMF (step 1306) in order to determine a set of adjoining HEVC tile streams that can be used to form an image region that comprises the ROI of frame f+n of the ROI stream (step 1308). The selected HEVC tile streams may be retrieved (step 1310) and are received by the client at a time T+n. Thereafter, the tile frames of the adjoining HEVC tile streams and the ROI frames of the rendered ROI stream may be synchronized. Frames f+n of spatially adjoining HEVC tile streams that have the same position on the content presentation timeline may be decoded (step 1312) in order to form an image region comprising the ROI of frame f+n of the ROI stream (step 1314). The time-shifted ROI coordinates (posf+n) may be used to crop the ROI out of the image region (step 1316) and the display of the content may be switched from rendering ROI frames in the ROI stream to rendering the cropped image regions of the HEVC tile streams (step 1318). This way, a smooth transition from a ROI streaming mode to a tiled streaming mode can be made even if the played-out content of the ROI streaming mode relates to a highly dynamic ROI trajectory.

It is submitted that FIGS. 13A and 13B provides just one embodiment of use of look-ahead position information and other implementations are also possible. For example, in an embodiment, the look-ahead position information may be generated by an algorithm that that predicts the trajectory of the ROI within the image region of the source video using e.g. a known extrapolation algorithm that uses the ROI position information that is available in the buffer of the client device.

FIG. 14A-14C depict ROI position information according to various embodiments of the invention. FIG. 14A depicts an example of ROI position information encoded in XML that describes a particular region of interest. The ROI position information in FIG. 14A depicts three consecutive ROIs tags.

A ROI tag may comprise information for correlating the ROI tag to a ROI frame in the ROI stream. For example, in FIG. 14A the <AbsoluteTime> tag may comprise a timestamp or another (unique) value that may be used to identify a frame in a stream. The time stamp may define an absolute time that is associated with the ROI. In an embodiment, the time stamp may comprise the wall-clock time defining the recording time of the ROI frame it is associated with. The absolute time may be encoded as the number of seconds since Jan. 1, 1970 in floating point notation (e.g. Unix epoch time). When using timestamps, the timestamps should also be embedded in the video frame(s) so that the frames may be correlated to the correct ROI position information (ROI tag).

Further, a ROI tag may comprise position information of the ROI. For example, the <PixelX1X2Y1Y2> tag may describe the position of the ROI in terms of pixel units. The top-left pixel of a screen may correspond to (X,Y)=(0,0). This wayX1 defines the left side of ROI; X2 defines the right side of ROI; Y1 defines the topside of ROI; and, Y2 defines the bottom side of ROI. In such scheme for a full HD 1920×1080 screen, the lower-right pixel corresponds to (X,Y)=(1919, 1079).

The first ROI in the example may define the full screen. The second ROI in the example may represents zooming to the centre by 80%. The third ROI in the example may represent a translation of 20 pixels to the right FIG. 14B depicts another embodiment of ROI position information encoded in XML. The ROI tag may comprise a <RelativeTime> tag that describes the relative time that applies to the ROI. The relative time may be counted from the starting point of the video content and may be encoded as seconds in floating point notation. The relative time may be used as correlation information in order to relate a ROI tag to a ROI frame. When using a relative time, a clearly defined starting point of the ROI stream should be defined.

Further, the ROI tag may comprise a <NormalizedXYzoom> tag that describes the location of the ROI, described a in normalized format (X,Y,zoom). Here the coordinates "X,Y" may indicate the position of the top-left pixel of the ROI in floating point notation wherein X and Y are both in the range 0-1. In this example, the top-left pixel of a screen corresponds to (X,Y)=(0,0) and the lower right of the full screen to (X,Y)=(1,1). The parameter "zoom" may define the zoom level, which may also be in floating point notation. Zoom=1 may correspond to the full screen.

The first ROI tag of FIG. 14B may represent the full screen. The second ROI may represent zooming to the top left by 50%. The third ROI in the example may represent a move of the top left of the ROI to the centre of the screen FIG. 14C depicts examples of tags that may be used in a ROI tag. The FrameNumber tag may be used as correlation information if frame numbers can be derived from the content. The PixelXYWH tag may define X,Y coordinates plus width and height of the ROI expressed in pixel units. The RadialNormalizedXYR tag may define X,Y coordinates of a circular ROI and its radius. In an embodiment, the X,Y coordinates may be normalized to a 0-1 scale. The SpeedPixeldXdYdWdH tag may define a time derivative of X,Y, width and height of the ROI, expressed in pixels-per-second.

FIG. 15 depicts an embodiment wherein ROI position information is transported as an elementary stream in an MPEG transport stream (MPEG TS). In particular, the ROI coordinates of the ROI stream may be packaged in a separate PES (Packetized Elementary Stream) with a Private Data Stream ID. This PES stream, which may be referred to as a ROI coordinate stream, may then be multiplexed in the MPEG Transport Stream that also comprises the ROI stream.

FIG. 15 depicts an XML representation of a PMT that includes a video stream (Type=0x2, PID=0x1B63), an audio stream (Type=0x3, PID=0x1B64) and a ROI Coordinate stream (new Type=0x20, PID=0x1B66). The new Stream Type may indicate a PES stream containing ROI coordinate information. This Stream Type can then be used in a PMT (Program Map Table) table to indicate the PID containing the ROI Coordinate stream.

On the client side, the synchronization between the video and the ROI coordinates may be realized through the use of PTS timestamps, which are common to all PES packets belonging to a particular program (and described by a single PMT). As an example, if the client needs to check the ROI coordinate of the ROI stream at a certain moment in time, it may check the PTS value of the currently displayed video frame. Thereafter, it may search in the PES that comprises the ROI coordinates (the ROI coordinate stream) for the packet with the same PTS. Within this packet, it will find the ROI coordinate information for that particular video frame.

In a further embodiment (that may also be used with MPEG Transport Streams) instead of defining a new Stream Type, the ROI Coordinate data (e.g. (optionally time-shifted) ROI coordinates) may be transported using the DVB-defined SAD (SynchronisedAuxilary Data) structure (see TS 102 823). In that case, the PMT table advertises the 0x06 Stream Type to indicate a private data PES stream. To indicate that the particular SAD comprises ROI Coordinates, a new Auxilary Data Descriptor may be defined (see section 5.1 of TS 102 823).

Apart from using the SAD structure to carry and indicate a ROI Coordinate stream instead of defining a new PES Stream Type, all other aspects of this embodiment are similar to those described for the embodiment as described with reference to FIG. 15. Since SAD packets also contain PTS values, these can be used to provide synchronization between the ROI Coordinate stream and the ROI stream.

In yet a further embodiment, in order to transport time-shifted ROI coordinates, the SAD packet not only comprise the ROI Coordinate data but also the timestamp to which the coordinate relates. Such a timestamp can be in the form of a frame number, content timestamp or PTS/DTS value. In the latter case, the PTS value in the packet header is used by the TS multiplexer to position the packet in the TS stream, while the PTS packet, which is included in the payload, is used to correlate the coordinate to a particular video frame.

FIGS. 16A and 16B depict an embodiment of the invention wherein ROI data are transported in the bitstream of an MPEG stream. In particular, FIG. 16A depicts an embodiment wherein the ROI data are inserted as a supplemental enhancement information (SEI) message in the bitstream of a MPEG stream that is encoded using an H.264/MPEG-4 based codec.

In this scheme, a NAL Unit may define an elementary block in the bitstream. A SEI message is defined as a NAL Unit associated with supplemental enhancement information (SEI) (see 7.4.1 NAL Units semantics in ISO/IEC 14496-10 AVC). Here the SEI message is defined as a type 5 message: user data unregistered. The SEI message may comprise predetermined number of integers (in this example four integers) for the parameters of the ROI data.

SEI messages may carry extra information in order to assist the process of decoding. Nevertheless their existence is not mandatory in order to construct the decoded signal so that conforming decoders are not required to take this extra information into consideration. The definition of the various SEI message and their semantics is defined in D.2 of ISO/IEC 14496-10:2012.

The SEI message type referred to as user data unregistered allows arbitrary data to be carried in the bitstream. In case of ROI coordinates this SEI message may be used to carry the ROI coordinates. Four parameters, i.e. horizontal position and vertical position of the top left corner and the width and the height may be used to define a ROI in the image region of decoded frames of the source video.

FIG. 16B depicts another embodiment of the invention wherein ROI data are transported in the coded bitstream. A Boolean flag in the frame header may indicate whether such information is present. In case a flag is set, the bits following the flag may represent the ROI coordinates, e.g. the position of the top-left corner in the horizontal and vertical axis as well as the width and height of the ROI within the image area of decoded frames of a source video.

Figures 17A, 17B:
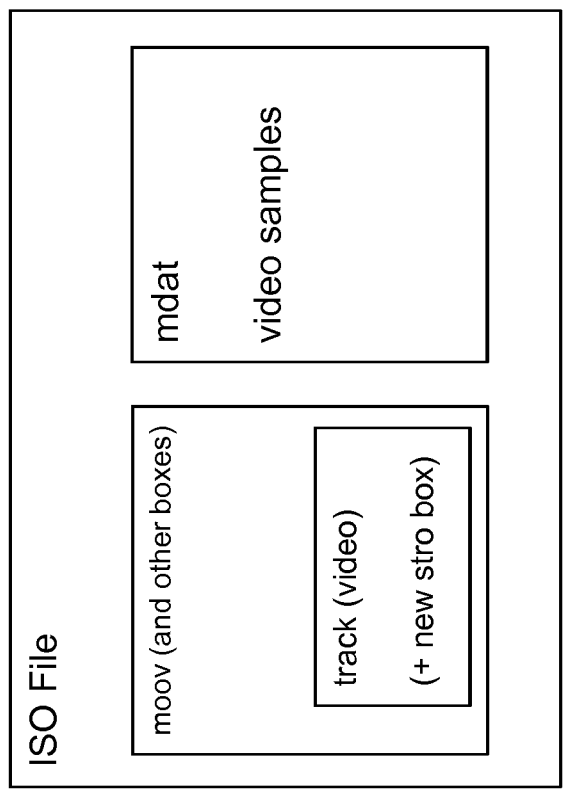
FIGS. 17A and 17B depict a data format for transporting ROI data in a new box of a MPEG-4 stream.

FIGS. 17A and 17B depict embodiments of the invention wherein the ROI data are transported in a video container. In particular, these figures relate to embodiments wherein the ROI coordinates are transported in a video container such as the MP4 file format (ISO/IEC 14496-14). The general structure of such a file is described in FIG. 17A. The MP4 file format specifies a set of boxes, which constitutes a hierarchical structure to store and access the media data and metadata associated with it. For example, the root box for the metadata related to the content is the "moov" box whereas the media data is stored in the "mdat" box. More particularly, the "stbl" box or "Sample Table Box" indexes the media samples of a track allowing to associate additional data with each sample. In case of a video track, a sample is a video frame. As a result adding a new box called "Sample ROI coordinates" or "stro" within the box "stbl" may be used to store the ROI coordinates for every frame of a video track. FIG. 17B depicts an embodiment of the invention wherein the ROI coordinates are transported in a new box "stro", which may comprises ROI coordinates for part of or all video samples of a video track.

Figure 18:
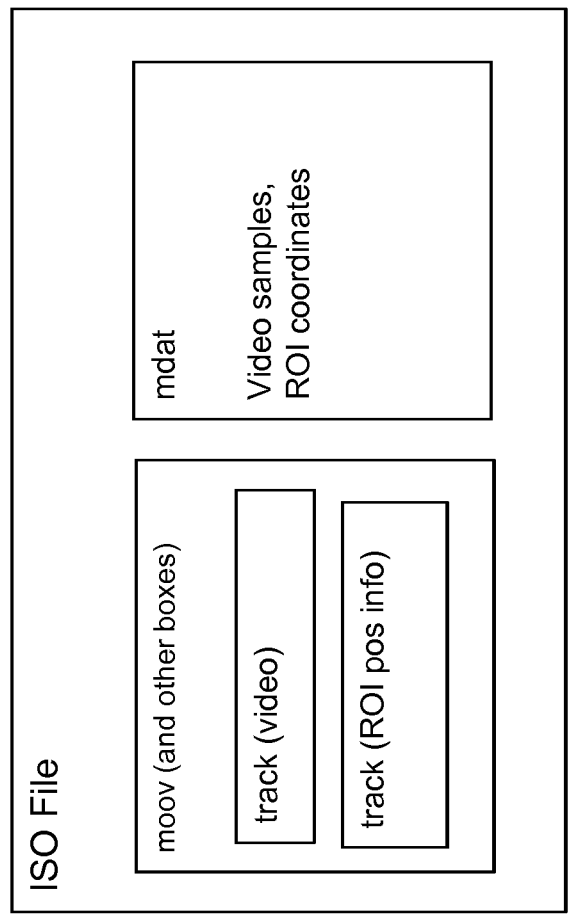
FIG. 18 depicts a data format for transporting ROI data as a metadata track of an MPEG-4 stream.

FIG. 18 depicts an embodiment of the invention wherein the ROI position information is transported as a dedicated metadata track of an MPEG-4 stream. The ROI position information track follows the structure of a regular track (like audio or video), however the data therein are not video or audio frames but metadata containing the ROI coordinates (with a specific sample entry code).

The standard ISO/IEC 14496 part 12 provides a mechanism to include a timed metadata track within the ISO Base Media File Format (and by inheritance to the MP4 File format). In this embodiment the metadata track and the video track have to be synchronized so that a sample of the ROI data track (a ROI coordinate) is mapped to a sample of the video track (a video frame). In practice, the metadata track is linked to the video track using a track-reference 'tref' box whose reference type is 'cdsc' and track id the id of the referenced track.

In a further embodiment, the ROI Coordinates may be delivered via an out-of-band file or stream to the client device. Synchronization may be achieved using timestamps. In an embodiment, the ROI coordinates may be put in a file, which is retrieved before starting playback (e.g. in case of VoD streams), before or delivering the data via a WebSocket (in case of live streams).

Since in this case the ROI Coordinates are send out-of-band with the actual video data, synchronization cannot be based on video container-internal information such as PTS values. Instead, content timestamps can be used. Such timestamps can either be based on content time (i.e. starting at 00:00:00 at the start of the video stream), or based on wall clock time (e.g. 20:31:11) for live broadcast streams. Similar timestamps should also be present in the video stream itself. For MPEG DASH or HLS streams, such timestamps may be provided by the MPD or manifest file. In the case where the ROI stream is delivered over e.g. DVB, DVB timeline packets inserted in the MPEG TS Multiplex (see 102 823) may be used.

In another embodiment, the ROI coordinates may be transported as a watermark in video (watermark). In a further embodiment, the ROI coordinates may be placed as watermarks in the ROI stream itself.

Figure 19B:
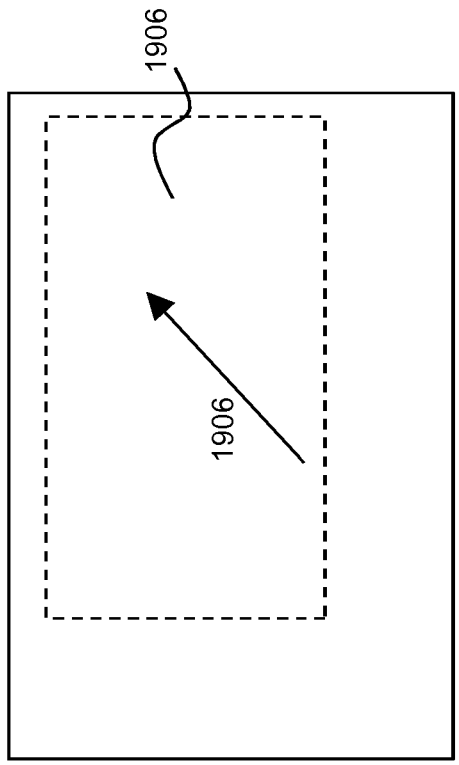
FIGS. 19A and 19B depicts the use of a spatial buffer for tiled streaming according to an embodiment of the invention.
Figure 19A:
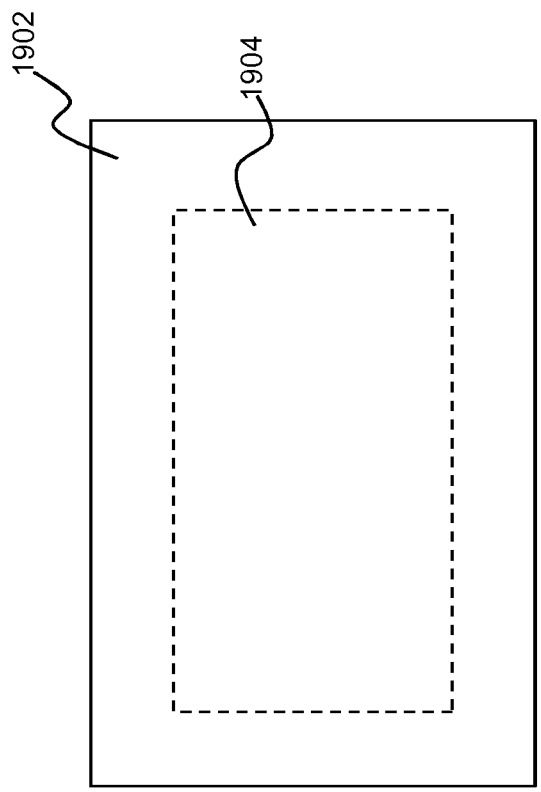

FIGS. 19A and 19B depict the use of a so-called "spatial buffer" for tiled streaming according to an embodiment of the invention. FIG. 19A depicts a ROI frame of a ROI stream wherein the ROI frame comprises a "spatial buffer" 1902, i.e. a peripheral region of image data (around a centred region of image 1904) that is transmitted to the client but that is not displayed when the user does not interact with the displayed content or when the user is not allowed to interact with the displayed content. Hence, in that case, the centre region that may be displayed when there is no user-interaction is cropped out of the ROI frame and displayed to the user. Then, when the user interacts with the content, (part of) the ROI 1906 is navigated into the zone that is defined as the spatial buffer. However, because there is user-interaction display of image data from the spatial buffer is allowed. The user interaction may trigger the client to switch to the tiled streaming mode and request tiles on the basis of the ROI as described in detail with reference to FIG. 9-14 above. During the retrieval of the HEVC tile stream, the moving ROI 1908 may be displayed by cropping the ROI out of an image region that is partially located in the zone of the spatial buffer. In an embodiment according to the invention one or more parameter(s) are defined in the SMF, preferably in a MPD (Media Presentation Description) to indicate the dimensions of the image area of the spatial buffer (which is the area of the image of the ROI stream that is not displayed. This parameter called e.g. @spatialbuffersize may for example be defined in one or more of the following formats:
Edge size in % of width and height (of the image area of the ROI)
Edge size in pixels (uniformly distributed around the displayed image area of the ROI)
Edge size in pixels (left, right, top, bottom, around the displayed image area of the ROI)
Alternative the set of available ROI coordinates could be extended from 4 (x, y, w, h) to 8, thus representing the inner (displayed) ROI and the outer ROI (including the spatial buffer) dimensions respectively.

Figure 20:
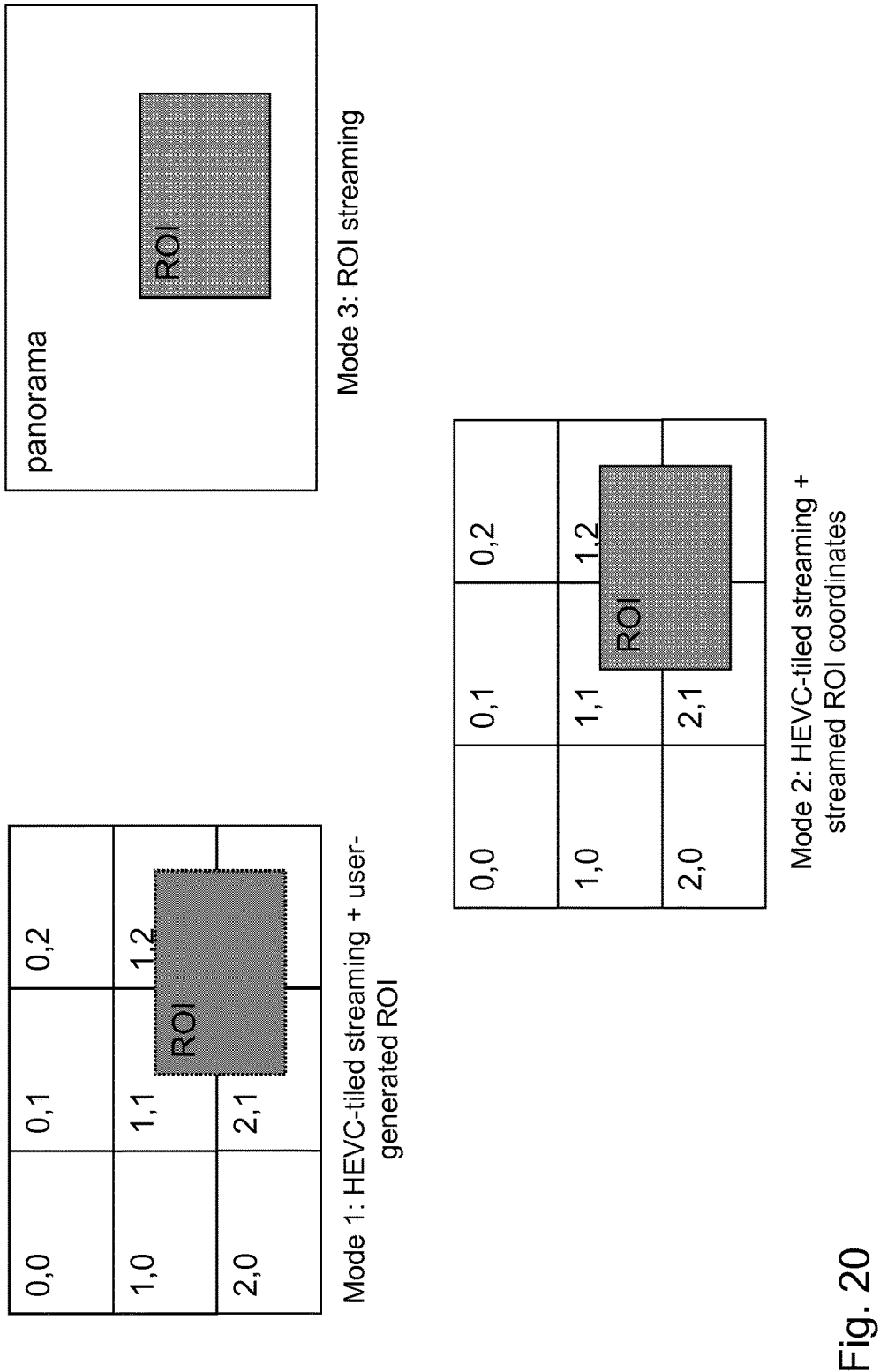
FIG. 20 depicts a three-mode ROI streaming model according to an embodiment of the invention.

FIG. 20 depicts a three-mode ROI streaming model according to an embodiment of the invention. In this particular embodiment, a client may be in the tiled streaming mode (a first mode) wherein a user-generated ROI is rendered on the basis of four tiles. If the user stops interacting and would like to view the content in the ROI streaming mode (a third mode), the system may switch for a predetermined time to a second mode instead of switching immediately to the ROI streaming mode. In this second mode, the client stays in the tiled streaming mode while receiving ROI position information of the ROI stream. The client then uses the ROI position information in order to select the tiles and generate a cropped image on the basis of synchronized frames of a set of HEVC tile streams as described in detail with reference to FIG. 9-14 above. If the user starts interacting with the displayed content, it may immediately switch to the tiled streaming mode (the first mode) for displaying a user-generated ROI. Alternatively, if the client predicts that a user is about to interact or if a certain period of the content displaying is started or about to start, wherein there is a high change that a user may wish to interact with the content, the client logic may cause switching to the second mode so that the transition to the tiled streaming mode for displaying a user-generated ROI may be realized in a fast and smooth (seamless) way.

Figure 21:
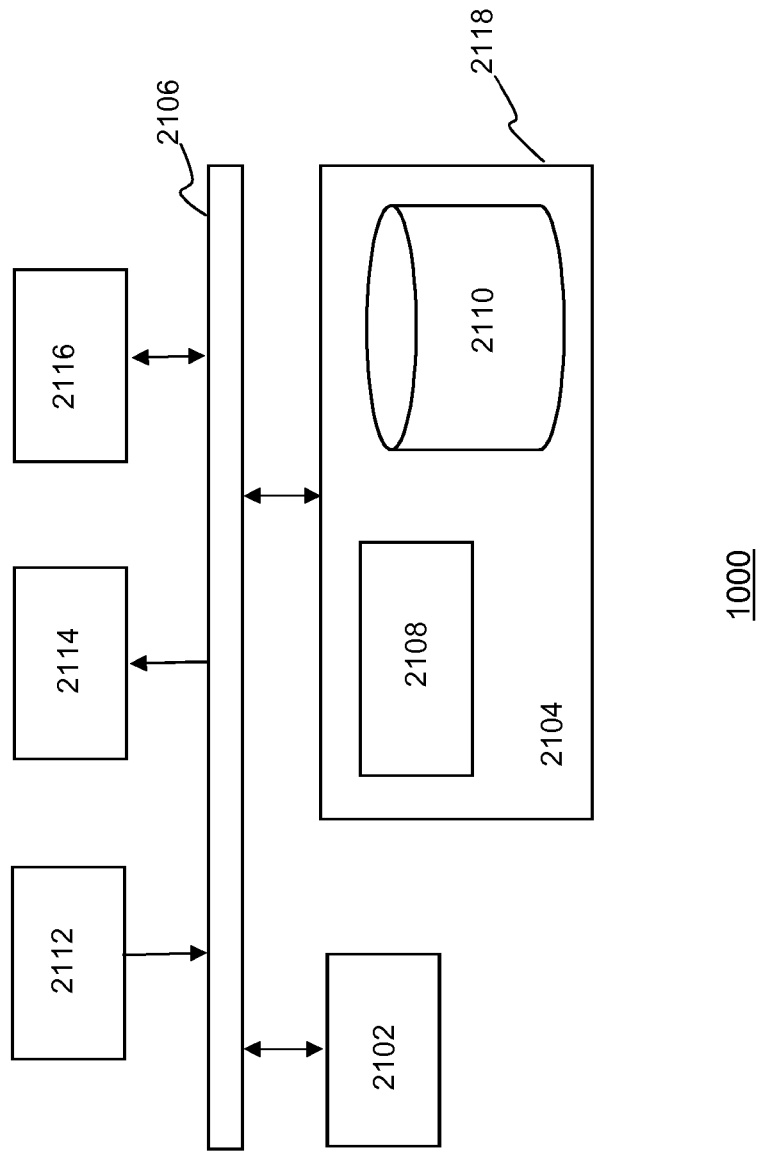
FIG. 21 is a block diagram illustrating an exemplary data processing system that may be used in systems and methods as described with reference to FIG. 1-20.

FIG. 21 is a block diagram illustrating an exemplary data processing system that may be used in systems and methods as described with reference to FIG. 1-20. Data processing system 1000 may include at least one processor 2102 coupled to memory elements 2104 through a system bus 2106. As such, the data processing system may store program code within memory elements 2104. Further, processor 2102 may execute the program code accessed from memory elements 2104 via system bus 2106. In one aspect, data processing system may be implemented as a computer that is suitable for storing and/or executing program code. It should be appreciated, however, that data processing system 2100 may be implemented in the form of any system including a processor and memory that is capable of performing the functions described within this specification.

Memory elements 2104 may include one or more physical memory devices such as, for example, local memory 2108 and one or more bulk storage devices 2110. Local memory may refer to random access memory or other non-persistent memory device(s) generally used during actual execution of the program code. A bulk storage device may be implemented as a hard drive or other persistent data storage device. The processing system 2100 may also include one or more cache memories (not shown) that provide temporary storage of at least some program code in order to reduce the number of times program code must be retrieved from bulk storage device 2110 during execution.

Input/output (I/O) devices depicted as input device 2112 and output device 2114 optionally can be coupled to the data processing system. Examples of input device may include, but are not limited to, for example, a keyboard, a pointing device such as a mouse, or the like. Examples of output device may include, but are not limited to, for example, a monitor or display, speakers, or the like. Input device and/or output device may be coupled to data processing system either directly or through intervening I/O controllers. A network adapter 2116 may also be coupled to data processing system to enable it to become coupled to other systems, computer systems, remote network devices, and/or remote storage devices through intervening private or public networks. The network adapter may comprise a data receiver for receiving data that is transmitted by said systems, devices and/or networks to said data and a data transmitter for transmitting data to said systems, devices and/or networks. Modems, cable modems, and Ethernet cards are examples of different types of network adapter that may be used with data processing system 2150.

As pictured in FIG. 21, memory elements 2104 may store an application 2118. It should be appreciated that data processing system 2100 may further execute an operating system (not shown) that can facilitate execution of the application. Application, being implemented in the form of executable program code, can be executed by data processing system 2100, e.g., by processor 2102. Responsive to executing application, data processing system may be configured to perform one or more operations to be described herein in further detail.

In one aspect, for example, data processing system 1000 may represent a client data processing system. The client data processing system is also referred to as a client device. In that case, application 2118 may represent a client application that, when executed, configures data processing system 2100 to perform the various functions described herein with reference to a "client". Examples of a client can include, but are not limited to, a personal computer, a portable computer, a mobile phone, or the like.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. Method for determining a region-of-interest (ROI) for a client device on the basis of at least one HEVC-tiled video stream, said HEVC-tiled video stream comprising a full image region, said method comprising:
   receiving, at said client device, a ROI video stream for rendering a first ROI defining a first sub-region within said full image region of said HEVC-tiled video stream, the positions of HEVC tiles in said HEVC-tiled video stream being defined by tile position information;
   providing, at said client device, ROI position information associated with at least one video frame of said ROI video stream, said ROI position information comprising at least a first position of said first ROI;
   identifying, by said client device, one or more HEVC tiles of said HEVC-tiled video stream on the basis of said ROI position information and said tile position information; and,
   requesting, by said client device, video data associated with said one or more identified HEVC tiles for rendering a second ROI defining a second sub-region within the full image region of said HEVC-tiled video stream;
   wherein at least part of said ROI position information is transported in the bitstream of said ROI video stream to said client device as a SEI message or a ROI coordinates flag defining the location of said ROI coordinates in said bitstream; or,
   wherein at least part of said ROI position information is transported in an elementary transport stream in an MPEG transport stream to the client device; or, as a DVB-defined SAD (Synchronized Auxiliary Data) packet in said MPEG transport stream, said SAD packet comprising a time-shifted ROI coordinate; or,
   wherein at least part of said ROI position information is transported in a predefined box in an MPEG-4 stream, said predefined box comprising at least one of a moov, trak and/or stbl box of an MPEG-4 stream; or,
   wherein at least part of said ROI position information is transported as a watermark to said client device in said ROI video stream.

2. Method according to claim 1, wherein providing said ROI position information further comprises:
   providing first ROI coordinates of at least a first image frame of said ROI video stream, said first ROI coordinates defining a first position of said first ROI at a first time instance of receiving an instruction for rendering a second ROI.

3. Method according to claim 2 wherein said instruction comprises a ROI vector for indicating a change of the position of said first ROI, said first ROI coordinates and said ROI vector being used for identifying said one or more HEVC tiles.

4. Method according to claim 2 wherein providing said ROI position information further comprises:
providing second ROI coordinates of at least a second image frame of said ROI video stream, said second ROI coordinates defining a second position of said first ROI at a second time instance of processing said ROI video stream by said client device; said first and second ROI coordinates being used for identifying said one or more HEVC tiles.

5. Method according to claim 1 wherein said requested video data are HEVC-encoded, said rendering of said second ROI comprising:
forming a decoded image region on the basis of said requested HEVC-encoded video data.

6. Method according to claim 5 wherein said rendering of said second ROI further comprises cropping said second ROI out of said decoded image region.

7. Method according to claim 1 wherein providing ROI position information further comprises:
providing look-ahead position information associated with at least one video frame of said ROI video stream that is not yet received by said client device, said look-ahead position information comprising a second position of a second ROI in said full image region.

8. Method according to claim 7 wherein said look-ahead position information comprises one or more time-shifted first ROI coordinates of one or more image frames in said ROI video stream that are not yet received by said client device.

9. Method according to claim 7, wherein said time-shifted first ROI coordinates being provided to said client device prior to said one or more image frames.

10. Method according to claim 9, wherein said time-shifted ROI coordinates being further associated with time-shift information for determining a time-shift.

11. Method according to claim 1
wherein at least part of said tile position information is provided to said client device in said HEVC-tiled video stream; and/or,
wherein at least part of said tile position information is provided in a spatial manifest file to said to said client device, said manifest file comprising one or more stream identifiers for locating one or more delivery nodes that are configured for delivering said HEVC-tiled video stream and/or said ROI video stream to said client device.

12. Method according to claim 11, wherein at least part of said tile position information is provided to said client device in a moov or moof box in said HEVC-tiled video stream.

13. Method according to claim 1 wherein said video data associated with said one or more identified HEVC tiles are requested on the basis of a spatial manifest file comprising at least one or more HEVC tile identifiers and said tile position information.

14. A computer program product, implemented on a computer-readable non-transitory storage medium, comprising software code portions configured for, when run in the memory of a computer, executing the method steps according to claim 1.

15. Method according to claim 1, wherein identifying further comprises identifying one or more HEVC tiles that overlap said first ROI.

16. Method according to claim 1, further comprising rendering, by said client device, said second ROI on the basis of said requested video data and said ROI position information.

17. Method according to claim 1, wherein said video data associated with said one or more identified HEVC tiles are requested on the basis of a spatial manifest file comprising at least one or more HEVC tile identifiers, one or more URLs, and said tile position information; and, one or more ROI video stream identifiers associated with one or more ROI video streams, at least one of said one or more ROI video stream identifiers being associated with a dynamic indicator for indicating that the ROI position information changes in time.

18. Method according to claim 17, wherein at least part of said ROI position information is transported in a predefined box in an MPEG-4 stream as a metadata track, the metadata track containing ROI coordinates as metadata with a specific sample entry code.

19. Method according to claim 1, wherein at least part of said ROI position information is transported in a predefined box in an MPEG-4 stream as a metadata track, the metadata track containing ROI coordinates as metadata with a specific sample entry code.

20. Client device for rendering a region of interest (ROI), said client device being configured for:
receiving a ROI video stream for rendering a first ROI defining a first sub-region within the full image region of a HEVC-tiled video stream, the positions of HEVC tiles in said HEVC-tiled video stream being defined by tile position information;
providing ROI position information associated with at least one video frame of said ROI video stream, said ROI position information comprising at least a first position of said first ROI;
identifying one or more HEVC tiles of said HEVC-tiled video stream on the basis of said ROI position information and said tile position information; and,
requesting video data associated with said one or more identified HEVC tiles, for rendering a second ROI defining a second sub-region within the full image region of said HEVC-tiled video stream;
wherein at least part of said ROI position information is transported in the bitstream of said ROI video stream to said client device; or,
wherein at least part of said ROI position information is transported in an MPEG transport stream to the client device; or, as a DVB-defined SAD (Synchronized Auxiliary Data) packet in said MPEG transport stream; or,
wherein at least part of said ROI position information is transported in a predefined box in an MPEG-4 stream; or,
wherein at least part of said ROI position information is transported as a watermark to said client device;
said client device further configured to request said video data associated with said one or more identified HEVC tiles on the basis of a spatial manifest file comprising at least one or more HEVC tile identifiers, one or more URLs, and said tile position information; and, one or more ROI video stream identifiers associated with one or more ROI video streams, at least one of said one or more ROI video stream identifiers being associated with a dynamic indicator for indicating that the ROI position information changes in time.

21. Non-transitory computer-readable storage media comprising a stored data structure and suitable for use by a client device according to claim 20, said data structure comprising:
one or more HEVC tile representations each representative of a HEVC-tiled video stream, a HEVC tile representation comprising one or more HEVC tile identifiers for identifying one or more HEVC tiles,
tile position information defining the position of the HEVC tiles in a HEVC-tiled video stream
said data structure further comprising at least one of:
at least one ROI stream identifier of a ROI stream comprising ROI position information, said ROI stream comprising video data for rendering a first ROI defining a sub-region within the full image region of said HEVC-tiled video stream, or
at least one ROI stream identifier of a ROI stream, said ROI stream comprising video data for rendering a first ROI defining a sub-region within the full image region of said HEVC-tiled video stream, and ROI positioning information defining the position of said sub-region within the full image region of said HEVC-tiled video stream.

22. Non-transitory computer-readable storage media according to claim 21, wherein the stored data structure is a spatial manifest file.

23. Non-transitory computer-readable storage media according to claim 21, wherein said data structure is arranged for retrieving tiles as HEVC tiled streams based on a HTTP adaptive streaming protocol,
each of said HEVC tiled streams being temporally segmented into a collection of tile segments, and whereby the data structure is arranged for identifying the tile segments that can be requested.

24. Client device according to claim 20, wherein identifying further comprises identifying one or more HEVC tiles that overlap said first ROI.

25. Client device according to claim 20, said client device further configured for rendering said second ROI on the basis of said requested video data and said ROI position information.

26. Client device according to claim 20, wherein at least part of said ROI position information is transported in a predefined box in an MPEG-4 stream as a metadata track, the metadata track containing ROI coordinates as metadata with a specific sample entry code.

27. Client device according to claim 20, wherein at least part of said ROI position information is transported in a predefined box in an MPEG-4 stream as a metadata track, the metadata track containing ROI coordinates as metadata with a specific sample entry code.

* * * * *